(12) United States Patent
Yamaguchi et al.

(10) Patent No.: US 12,352,596 B2
(45) Date of Patent: Jul. 8, 2025

(54) HEAD-UP DISPLAY, VEHICLE DEVICE, AND INFORMATION DISPLAY METHOD

(71) Applicant: Ricoh Company, Ltd., Tokyo (JP)

(72) Inventors: Hiroshi Yamaguchi, Kanagawa (JP); Kenichiroh Saisho, Tokyo (JP); Yuuki Suzuki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 733 days.

(21) Appl. No.: 17/148,671

(22) Filed: Jan. 14, 2021

(65) Prior Publication Data

US 2021/0131818 A1 May 6, 2021

Related U.S. Application Data

(63) Continuation of application No. 15/597,351, filed on May 17, 2017, now Pat. No. 11,333,521.

(30) Foreign Application Priority Data

May 20, 2016 (JP) .................................. 2016-101188
Apr. 13, 2017 (JP) .................................. 2017-079383

(51) Int. Cl.
*G01C 21/36* (2006.01)
*B60K 35/00* (2024.01)
(Continued)

(52) U.S. Cl.
CPC ............ *G01C 21/365* (2013.01); *B60K 35/00* (2013.01); *G02B 27/01* (2013.01);
(Continued)

(58) Field of Classification Search
CPC ............ B60K 35/00; B60K 2370/1529; B60K 2370/334; B60K 2370/1868;
(Continued)

(56) References Cited

U.S. PATENT DOCUMENTS

| 8,004,428 B2 | 8/2011 | Koenig |
| 8,831,883 B2 | 9/2014 | Breisinger |

(Continued)

FOREIGN PATENT DOCUMENTS

| DE | 10 2014 014 833 A1 | 4/2015 |
| DE | 10 2014 200 407 A1 | 7/2015 |

(Continued)

OTHER PUBLICATIONS

Translation of WO2015072013 (Year: 2015).*

(Continued)

*Primary Examiner* — Jie Lei
(74) *Attorney, Agent, or Firm* — XSENSUS LLP

(57) ABSTRACT

A head-up display (HUD) including a direction-information generator, a shift device, and a display system. The direction-information generator generates direction information to be superimposed on a road surface ahead of a vehicle on which the HUD is mounted. The direction information represents a direction of travel to be followed by the vehicle. The shift device shifts at least some of the direction-change information into the display area when the direction information includes direction-change information to represent a change in the direction of travel and the direction-change information falls outside a display area. The display system displays the direction information within the display area as a virtual image.

19 Claims, 17 Drawing Sheets

(51) Int. Cl.
  *B60R 1/00* (2022.01)
  *G02B 27/01* (2006.01)
  *B60K 35/23* (2024.01)
  *B60K 35/28* (2024.01)

(52) U.S. Cl.
  CPC .......... *G02B 27/0101* (2013.01); *B60K 35/23* (2024.01); *B60K 35/28* (2024.01); *B60K 2360/166* (2024.01); *B60K 2360/175* (2024.01); *B60K 2360/177* (2024.01); *B60K 2360/334* (2024.01); *B60R 2300/205* (2013.01); *B60R 2300/302* (2013.01); *B60R 2300/305* (2013.01); *B60R 2300/308* (2013.01); *G02B 2027/0129* (2013.01); *G02B 2027/0181* (2013.01); *G02B 2027/0183* (2013.01)

(58) Field of Classification Search
  CPC  B60K 2370/1876; B60K 35/28; B60K 35/23; B60K 35/233; B60K 35/81; B60K 2360/166; B60K 2360/175; B60K 2360/334; B60K 2360/177; B60R 1/00; B60R 2300/205; B60R 2300/305; G02B 27/01; G02B 27/0101; G02B 2027/0181; G02B 2027/0183; G02B 27/0149; G02B 27/0172; G02B 27/0103; G02B 27/64; G02B 2027/0129; G01C 21/00; G01C 21/36; G01C 21/365
  USPC .......................... 359/630–633, 13, 858, 599
  See application file for complete search history.

(56) References Cited

U.S. PATENT DOCUMENTS

| | | | |
|---|---|---|---|
| RE45,918 E | | 3/2016 | Saisho et al. |
| 11,333,521 B2 * | | 5/2022 | Yamaguchi ............... B60R 1/00 |
| 2006/0187294 A1 | | 8/2006 | Saisho et al. |
| 2006/0284968 A1 | | 12/2006 | Hayashi et al. |
| 2007/0211326 A1 | | 9/2007 | Saisho et al. |
| 2007/0253048 A1 | | 11/2007 | Sakai et al. |
| 2008/0025759 A1 | | 1/2008 | Ichii et al. |
| 2008/0055692 A1 | | 3/2008 | Saisho et al. |
| 2008/0068689 A1 | | 3/2008 | Saisho et al. |
| 2008/0068693 A1 | | 3/2008 | Hayashi et al. |
| 2008/0218827 A1 | | 9/2008 | Watanabe et al. |
| 2009/0058979 A1 | | 3/2009 | Saisho et al. |
| 2009/0059337 A1 | | 3/2009 | Saisho |
| 2009/0257780 A1 | | 10/2009 | Maruyama et al. |
| 2010/0164702 A1 | | 7/2010 | Sasaki et al. |
| 2010/0271669 A1 | | 10/2010 | Yamaguchi |
| 2010/0328417 A1 | | 12/2010 | Saisho et al. |
| 2011/0002025 A1 | | 1/2011 | Tokita et al. |
| 2011/0228368 A1 | | 9/2011 | Sakai et al. |
| 2011/0235132 A1 | | 9/2011 | Saisho et al. |
| 2011/0316959 A1 | | 12/2011 | Saisho et al. |
| 2012/0127184 A1 | | 5/2012 | Satoh et al. |
| 2012/0224062 A1 | | 9/2012 | Lacoste |
| 2013/0063754 A1 | | 3/2013 | Saisho et al. |
| 2013/0074008 A1 | | 3/2013 | Umezawa et al. |
| 2013/0113823 A1 | | 5/2013 | Umezawa et al. |
| 2013/0163019 A1 | | 6/2013 | Tago et al. |
| 2014/0177022 A1 | | 6/2014 | Saisho et al. |
| 2014/0267423 A1 | | 9/2014 | Itoh et al. |
| 2015/0277115 A1 | | 10/2015 | Inamoto et al. |
| 2015/0370069 A1 | | 12/2015 | Saisho et al. |
| 2015/0370318 A1 | | 12/2015 | Yamaguchi et al. |
| 2016/0052394 A1 | | 2/2016 | Yamada |
| 2016/0062115 A1 | | 3/2016 | Girschick |
| 2016/0073031 A1 * | | 3/2016 | Watanabe .......... G02B 27/0149 345/7 |
| 2016/0170487 A1 | | 6/2016 | Saisho |
| 2016/0252802 A1 | | 9/2016 | Yamaguchi et al. |
| 2016/0313562 A1 | | 10/2016 | Saisho et al. |
| 2016/0327402 A1 | | 11/2016 | Funabiki |
| 2016/0334637 A1 | | 11/2016 | Saisho et al. |

FOREIGN PATENT DOCUMENTS

| | | | | |
|---|---|---|---|---|
| JP | 2009-250827 A | | 10/2009 | |
| JP | 2011121401 A | * | 6/2011 | .......... G01C 21/365 |
| JP | 2012-35745 A | | 2/2012 | |
| JP | 2015-147518 A | | 8/2015 | |
| JP | 2016-1109 A | | 1/2016 | |
| JP | 2016-045705 | | 4/2016 | |
| WO | WO-2015072013 A1 | * | 5/2015 | ............. B60K 35/00 |
| WO | WO-2017126353 A1 | * | 7/2017 | ............. B60K 35/00 |

OTHER PUBLICATIONS

Ranslaiont of JP201121401 (Year: 2011).*
Text translation of WO2017126353 (Year: 2017).*
Japanese Office Action issued on Dec. 8, 2020 in Japanese Patent Application No. 2017-079383, citing references AO and AP therein, 3 pages.
Japanese Office Action issued Feb. 9, 2021 in Japanese Patent Application No. 2019-153338, citing document AO therein, 3 pages.
Extended European Search Report issued Nov. 3, 2017 in Patent Application No. 17171589.9.
U.S. Office Action issued Sep. 21, 2021 in U.S. Appl. No. 15/597,351, 24 pages.

* cited by examiner

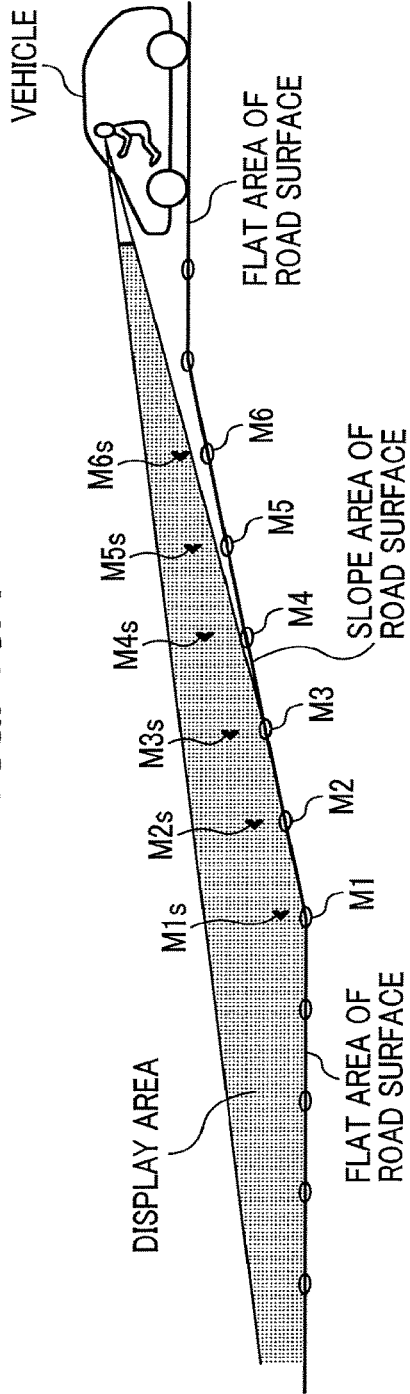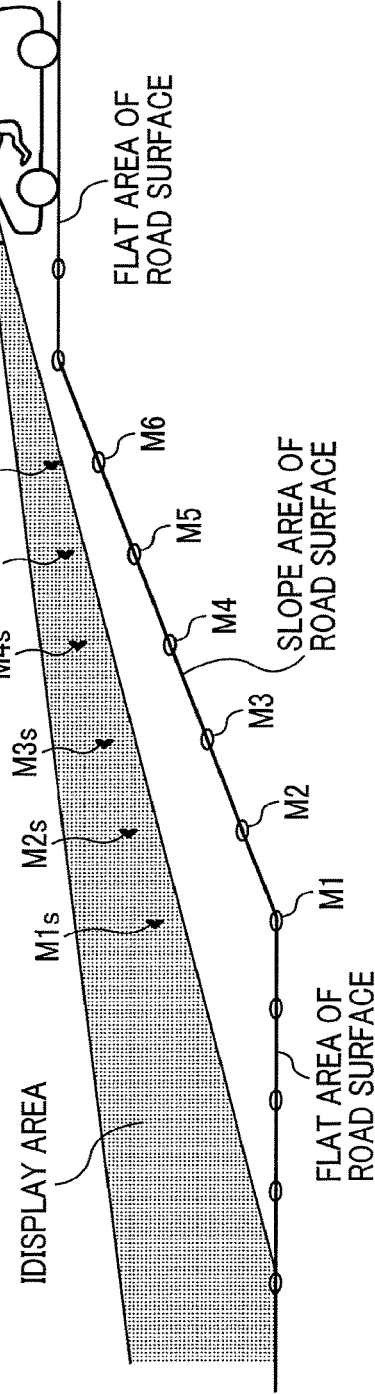

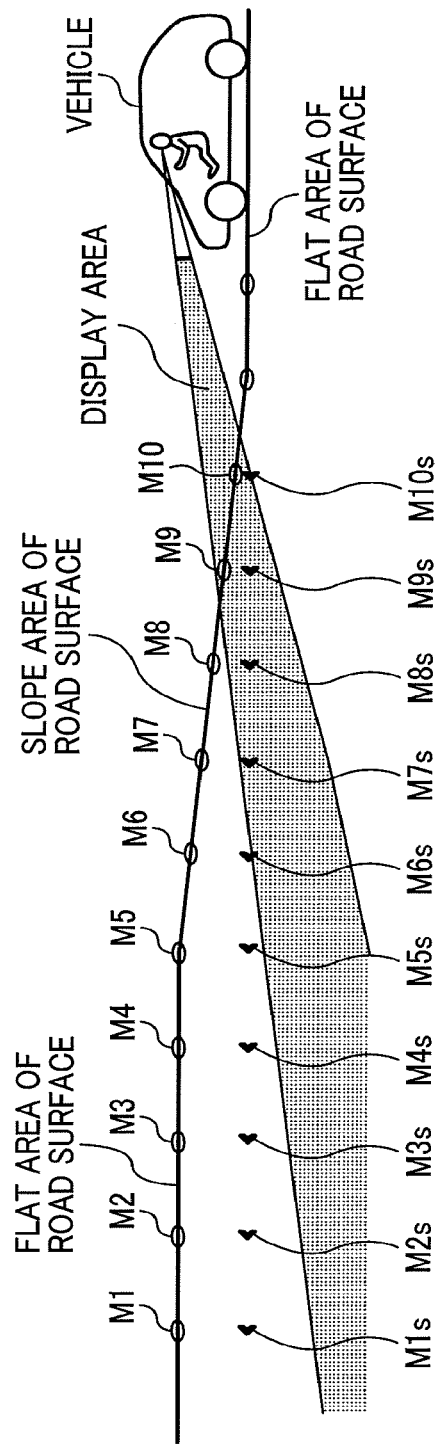

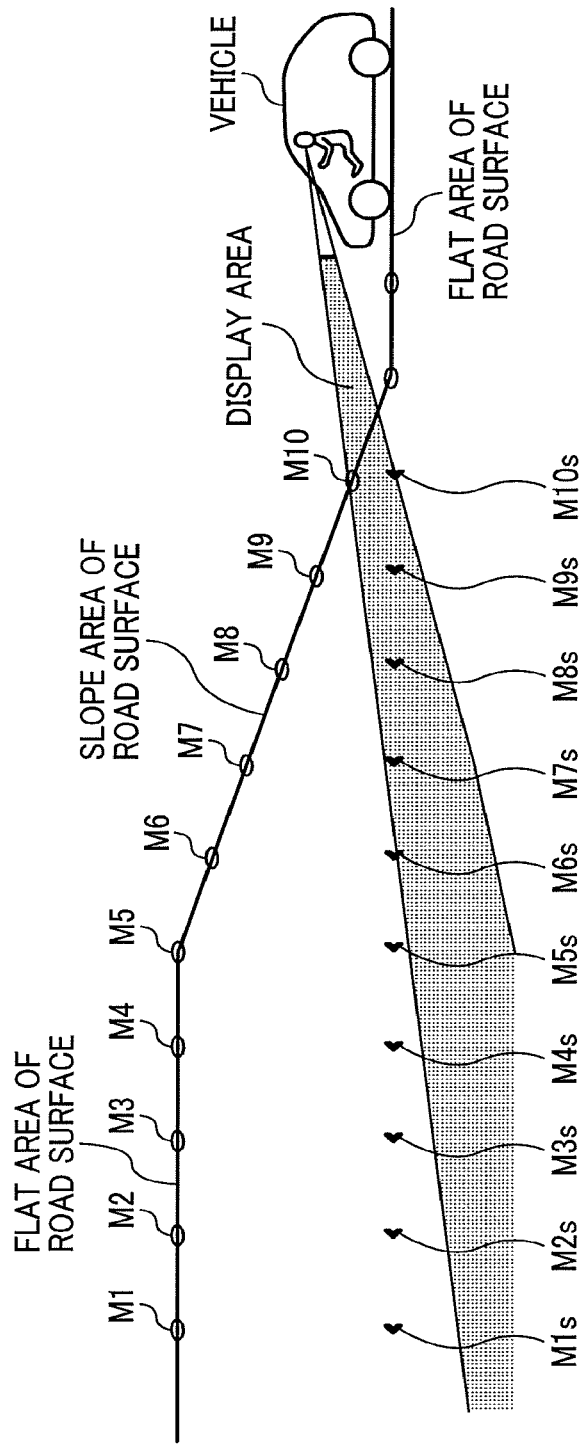

HEAD-UP DISPLAY, VEHICLE DEVICE, AND INFORMATION DISPLAY METHOD

CROSS-REFERENCE TO RELATED APPLICATIONS

This application is a continuation of and claims the benefit of priority under 35 U.S.C. § 120 from U.S. application Ser. No. 15/597,351 filed May 17, 2017, and claims the benefit of priority under 35 U.S.C. § 119 from Japanese Patent Application No. 2016-101188 filed May 20, 2016 and Japanese Patent Application No. 2017-079383 filed Apr. 13, 2017, the entire contents of each of which are incorporated herein by reference.

BACKGROUND

Technical Field

Embodiments of the present disclosure relate to a heads-up display, a vehicle device, and an information display method.

Related Art

A device is known that generates direction information that indicates a traveling direction to be followed by a vehicle on a road surface ahead of the vehicle, and further displays some of the generated direction information as a virtual image within a predetermined display area.

However, such a device fails to reliably display at least some of direction information within the display area, particularly when the direction information includes direction-change information.

SUMMARY

In one aspect of this disclosure, there is provided an improved head-up display (HUD) including a direction-information generator, a shift device, and a display system. The direction-information generator generates direction information to be virtually superimposed on a road surface ahead of a vehicle on which the HUD is mounted. The direction information represents a traveling direction to be followed by the vehicle. The shift device shifts at least some of the direction-change information into the display area when the direction information includes direction-change information to represent a change in the traveling-direction and the direction-change information falls outside a display area. The display system displays the direction information within the display area as a virtual image.

In another aspect of this disclosure, there is provided an improved vehicle device including the above-described HUD and the vehicle equipped with the HUD.

In still another aspect of this disclosure, there is provided an improved information display method including generating direction information representing a traveling direction to be followed by a vehicle to superimpose the direction information on a road surface ahead of the vehicle; determining whether direction-change information is outside a display area when the direction information includes the direction-change information; shifting the direction-change information to make at least some of the direction-change information fall within the display area when an affirmative determination is made in the determining; and displaying the direction information as a virtual image within the display area.

BRIEF DESCRIPTION OF THE DRAWINGS

The aforementioned and other aspects, features, and advantages of the present disclosure will be better understood by reference to the following detailed description when considered in connection with the accompanying drawings, wherein:

FIG. 18A is an illustration of an example in which there is a downward slope in a road surface;

FIG. 18B is an illustration of another example in which there is a downward slope in a road surface;

FIG. 20A is an illustration of an example in which there is a in an upward slope in a road surface;

FIG. 20B is an illustration of another example in which there is an upward slope in a road surface;

Figure 1:
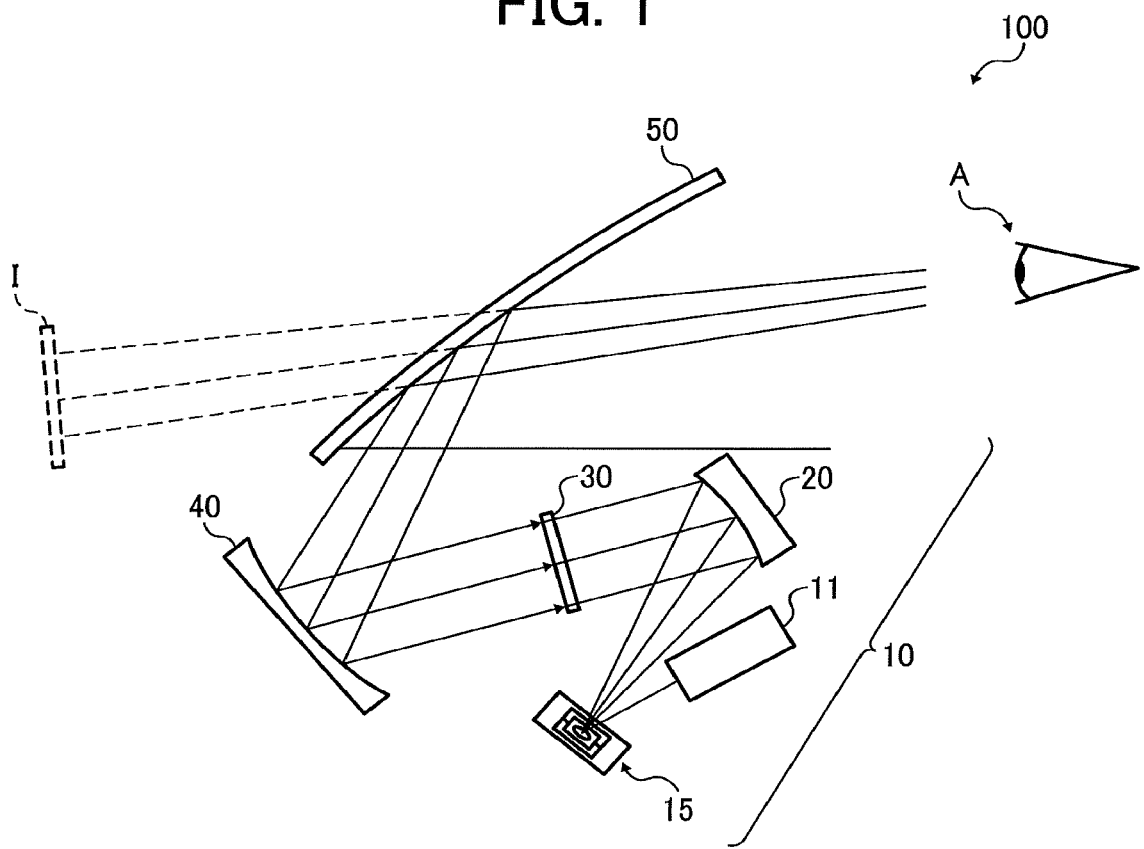
FIG. 1 is an illustration of a schematic configuration of a heads-up display (HUD) according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that have the same function, operate in a similar manner, and achieve similar results.

Although the embodiments are described with technical limitations with reference to the attached drawings, such description is not intended to limit the scope of the disclosure and all of the components or elements described in the embodiments of this disclosure are not necessarily indispensable.

A description is given of a heads-up display (HUD) 100 as an image display apparatus according to an embodiment of the present disclosure, referring to the Figures. Note that, in this specification, the term "HUD" stands for a heads-up display.

FIG. 1 is an illustration of a schematic configuration of the HUD 100 according to the present embodiment.

Schematic Configuration of HUD

As an HUD projection method, there is a panel system and a laser scanning system. In the panel system, an imaging device, such as a liquid crystal display (LCD), a digital micro-mirror device (DMD) panel (digital mirror device panel), or a vacuum fluorescent display (VFD) is used to form an intermediate image. In the laser scanning method, a two-dimensional scanning device scans an object with a laser beam emitted from a laser beam source to form an intermediate image. In particular, in the latter laser scan type, unlike the panel type where the image is formed by partial light blocking over the entire screen emission, since emission can be controlled on a pixel-by-pixel basis, in general, a high-contrast image can be formed.

In view of the above, the HUD 100 according to the present embodiment adopts the laser scanning system, although of course the above-described panel system can also be used.

The HUD 100 is mounted, for example, on a mobile object such as a vehicle, and makes navigation information used for operating the vehicle (for example, speed of the vehicle, course information, distance to a destination, name of current place, the presence and position of an object ahead of the vehicle, signs, such as speed limit, and traffic congestion information) visible through a front windshield 50 (see FIG. 1) of the vehicle. In such a case, the front windshield 50 also serves as a transmission and reflection member that transmits a portion of the incident light and reflects at least some of the remaining incident light. In the following description, cases in which the HUD 100 is mounted on a vehicle having the front windshield 50 are described.

As illustrated in FIG. 1, the HUD 100 includes an optical scanning device 10, a screen 30, and a concave mirror 40. The optical scanning device 10 includes a light-source device 11, a light deflector 15, and a scanning mirror 20. The HUD 100 emits light (image light) for forming an image on the front windshield 50, to allow a viewer A (in the present embodiment, a driver of a vehicle) to visually identify a virtual image I at eye-level. In other words, the viewer A can visually identify, through the front windshield 50, an image (intermediate image) as the virtual image formed (drawn) on the screen 30 by the optical scanning device 10.

The HUD 100 is disposed under the dashboard of the vehicle, as an example. The distance from the location of the eye of the viewer A to the front windshield 50 ranges from several tens of centimeters (cm) to approximately 1 meter (m).

In the present embodiment, the concave mirror 40 is designed by using commercially available optical-designed simulation software such that the concave mirror 40 obtains a predetermined level of light-gathering power to achieve a desired image-forming position of the virtual image I.

In the HUD 100, the light-gathering power of the concave mirror 40 is designed such that the virtual image I is displayed at a position (depth) 1 m or more and 10 m or less (preferably 6 m or less) away from the eye of the viewer A.

The front windshield 50 typically has a slightly curved surface, and is not a flat plane. The curved surfaces of the concave mirror 40 and the front windshield 50 determine the image-forming position of the virtual image I.

The light-source device 11 combines laser beams of three colors R (red), G (green), and B (blue) modulated according to image data. The combined light, in which the three-color laser beams are combined, is guided to the reflection plane of the light deflector 15. The light deflector 15 as a deflector is a two-axis micro-electromechanical system (MEMS scanner produced by a semiconductor manufacturing process. The light deflector 15 includes a single micro-mirror that is independently rotatable about two perpendicular axes. The light-source device 11 and the light deflector 15 are described later in detail.

The light (the above-described combined light) according to image data output from the light-source device 11 is deflected by the light deflector 15 and reflected by the scanning mirror 20. Thus, the light is directed to the screen 30. Then, the screen 30 is optically scanned to form an intermediate image thereon. The light deflector 15 and the scanning mirror 20 constitute an optical scanning system. Note that, preferably, the concave mirror 40 is designed and disposed to correct the optical deformation in which the horizon of the intermediate image is distorted convexly upward or downward due to the shape of the front windshield 50.

The light having passed through the screen 30 is reflected by the concave mirror 40 toward the front windshield 50. Some of light rays that enter the front windshield 50 permeate the front windshield 50, and at least some of the remaining light rays are reflected by the front windshield 50 toward the viewpoint position of a viewer A. As a result, the viewer A can visually identify, through the front windshield 50, a virtual image I that is an enlarged intermediate image. That is, the viewer A can see an enlarged virtual image I through the front windshield 50.

In some embodiments, a combiner as the transmission and reflection member may be disposed closer to the viewpoint position of the viewer A than the front windshield 50 to receive light from the concave mirror 40, which allows displaying a virtual image in the same manner as in the configuration with only the front windshield 50 disposed.

Hardware Configuration of Control System of the HUD

Figure 2:
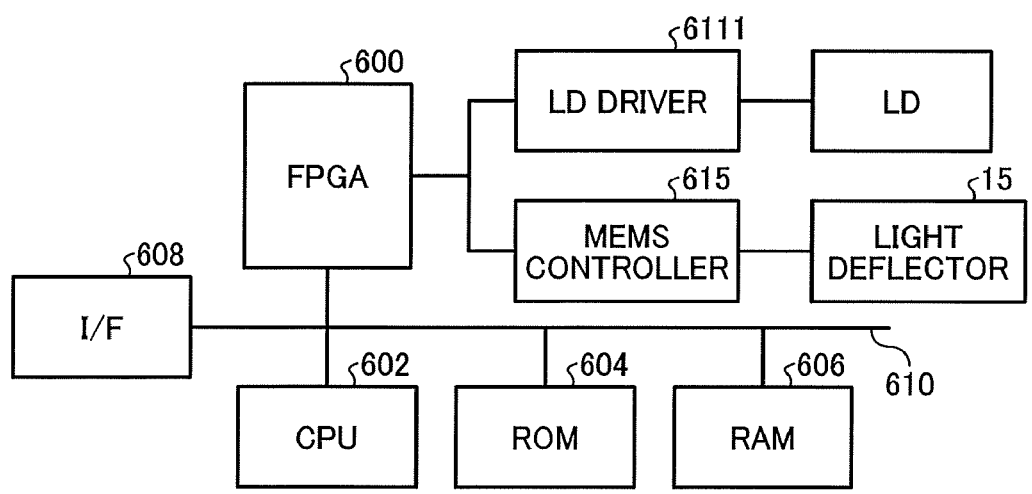
FIG. 2 is a block diagram of a hardware configuration of a control system of the HUD illustrated in FIG. 1.

FIG. 2 is a block diagram of a hardware configuration of a control system 6000 of the HUD 100. As illustrated in FIG. 2, the control system 6000 of the HUD 100 includes a field programmable gate array (FPGA) 600, a central processing unit (CPU) 602, a read-only memory (ROM) 604, a random access memory (RAM) 606, an interface (IF) 608, a bus line 610, a laser diode (LD) driver 6111, and a micro-electromechanical system (MEMS) controller 615.

The FPGA 600 causes the LD driver 6111 to drive an LD described below, and causes the MEMS controller 615 to controls the light deflector 15 according to image data.

The CPU 602 controls each operation of the HUD 100. The ROM 604 stores an image processing program that is executed by the CPU 602 to control each operation of the HUD 100. The RAM 606 is used as a working area in which the CPU 602 executes the program. The IF 608 is an interface to communicate with an external controller such as a controller area network (CAN) of a vehicle.

Functional Blocks of the HUD

Figure 3:
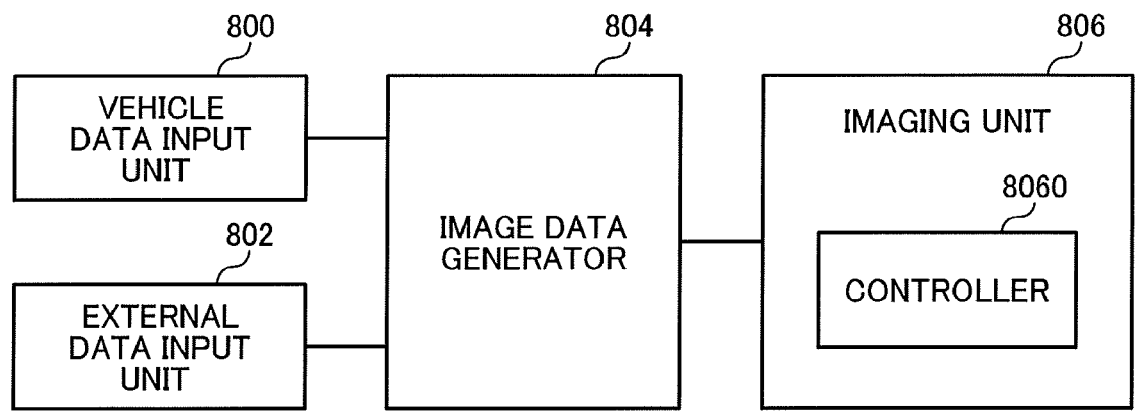
FIG. 3 is a functional block diagram of the HUD of FIG. 2 according to an embodiment of the present disclosure.

FIG. 3 is a functional block diagram of the HUD 100 illustrated in FIG. 2. As illustrated in FIG. 3, the HUD 100 includes a vehicle data input unit 800, an external data input unit 802, an image data generator 804, and an imaging unit 806. The vehicle data input unit 800 receives vehicle-related data, such as the speed of the vehicle, the distance to a target, and the exterior brightness, from the CAN. The external data input unit 802 receives external data, such as navigation information from the global positioning system (GPS) mounted on a vehicle, from the external network. The image data generator 804 generates image data of an image to be drawn according to the data input from the vehicle data input unit 800 and the external data input unit 802, and sends the generated image data to an imaging unit 806. The imaging unit 806 includes a controller 8060 to draw an image according to the image data received. The image data generator 804 and the controller 8060 are implemented by the FPGA 600. The imaging unit 806 is implemented by the FPGA 600, the LD driver 6111, the MEMS controller 615, the optical scanning device 10, the screen 30, and the concave mirror 40.

Configuration of Light-Source Device

Figure 4:
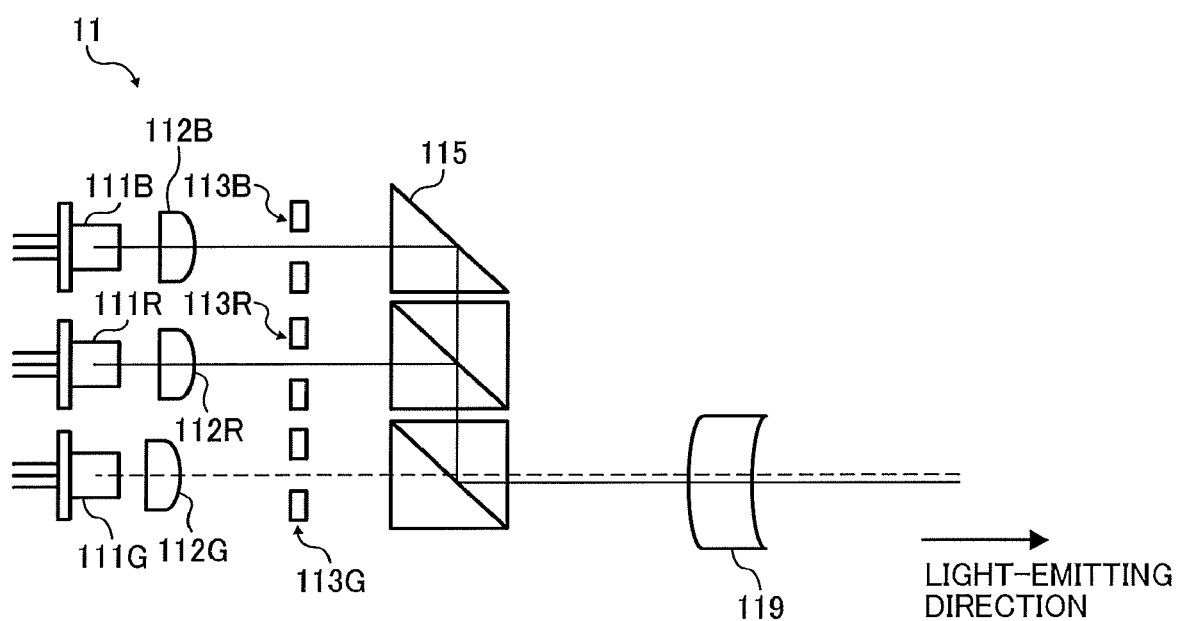
FIG. 4 is an illustration of a light-source device of the HUD according to an embodiment of the present disclosure.

FIG. 4 is an illustration of a configuration of the light-source device 11. As illustrated in FIG. 4, the light-source device 11 includes a plurality of light-emitting elements 111R, 111B, and 111G each having a single or a plurality of (for example, three light-emitting points in the present embodiment) light-emitting points. Each of the light-emitting elements 111R, 111B, and 111G is laser diode (LD). The light-emitting elements 111R, 111B, and 111G emit light beams having different wavelengths $\lambda R$, $\lambda G$, and $\lambda B$, respectively. For example, the wavelength $\lambda R$ is 640 nanometer (nm), the wavelength $\lambda G$ is 530 nm, and $\lambda B$ is 445 nm. Laser beams $\lambda R$, $\lambda G$, and $\lambda B$ emitted from the light-emitting elements (LD) 111R, 111G, and 111B pass through the respective coupling lenses 112R, 112G, and 112B to be coupled to a subsequent optical system. The coupled laser beams are shaped by aperture members 113R, 113G, and 113B corresponding to the respective laser beams. The aperture members 113R, 113G, and 113B may have any shape, such as a circle, an ellipse, a rectangle, or a square, according to the divergence angle of the laser beam. The laser beams shaped by the corresponding aperture members 113R, 113G, and 113B pass through a combining element 115 to be combined into one laser beam that travels along one optical path. The combining element 115 is a plate or prismatic dichroic mirror to reflect or transmit each of the laser beams therethrough according to the wavelength of each of the laser beams and thus combine the laser beams into one laser beam that travels along one optical path. The combined laser beam passes through a lens 119 to be guided to the reflection plane of the light deflector 15. The lens 119 is a meniscus lens having a concave surface facing the light deflector 15.

Configuration of Light Deflector

Figure 5:
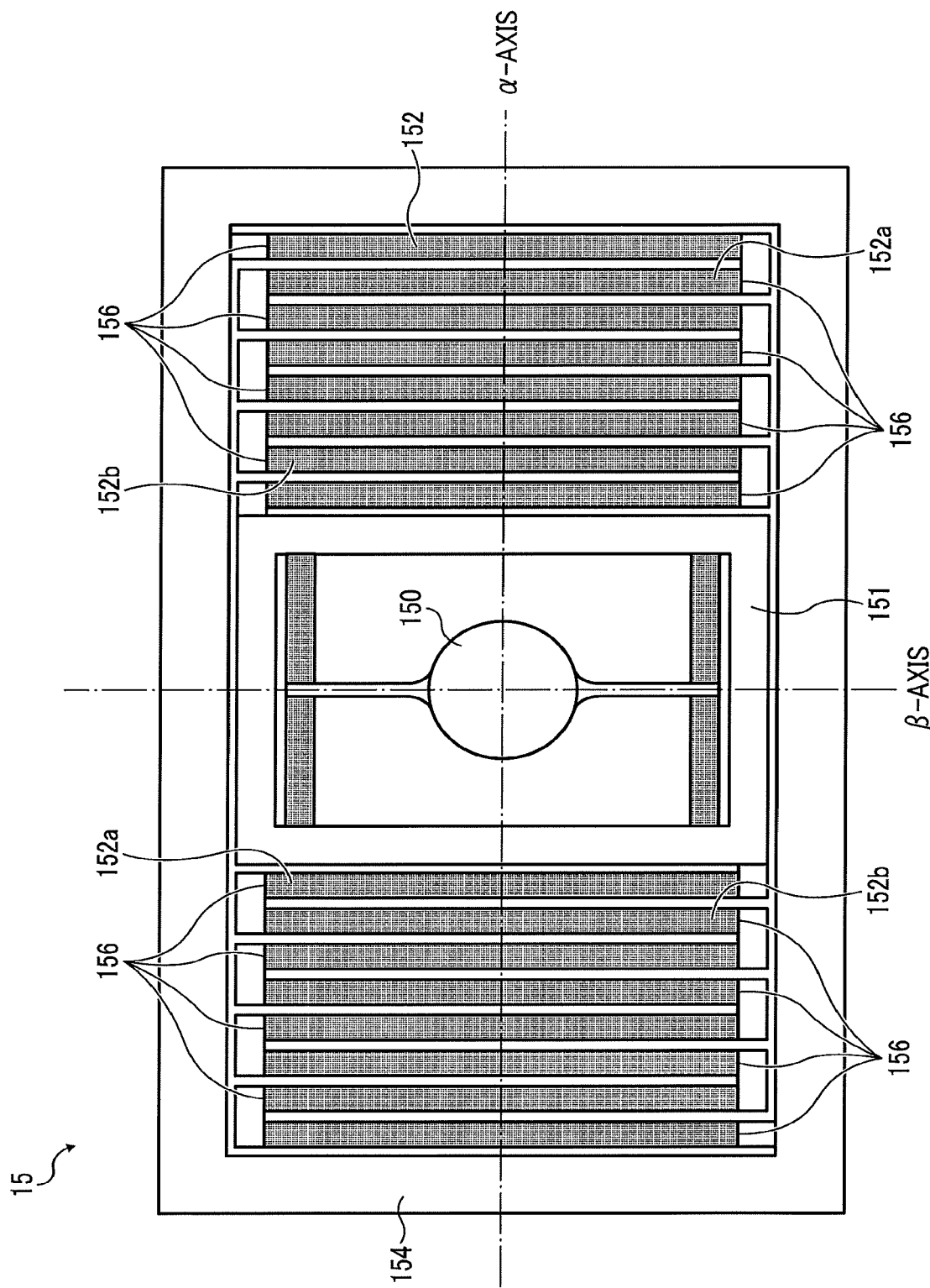
FIG. 5 is an illustration of a light deflector of the HUD according to an embodiment of the present disclosure.

FIG. 5 is an illustration of a configuration of the light deflector 15. As illustrated in FIG. 5, the light deflector 15, which is a two-axis MEMS scanner produced by a semiconductor manufacturing process, includes a mirror 150 having a reflection plane and a plurality of bars arranged in an a-axis direction. The light deflector 15 further includes a pair of serpentine units 152 in which two adjacent beams are connected to form a meander. The two adjacent beams of each serpentine unit 152 are a first beam 152a and a second beam 152b. The first beam 152a and the second beam 152b are supported by a frame member 154. Each of the first beam 152a and the second beam 152b is provided with a plurality of piezoelectric materials 156 (for example, PZT (lead zirconate titanate)). Different voltages are applied to the piezoelectric member of the two adjacent beams in each serpentine unit 152. Accordingly, the two adjacent beams 152a and 152b bend in different directions. As elastic energy is accumulated in the bent portion, the mirror 150 rotates about the α axis (in the vertical direction) with a wide angle. Due to such a configuration, optical scanning where the vertical axis is the center of the αaxis can be performed in the vertical direction with lower voltage. On the other hand, around the β axis in the horizontal direction, the optical scanning with resonance is performed using, for example, a torsion bar that is connected to the mirror 150.

Although the HUD 100 momentarily projects a dot image corresponding to a laser beam diameter, an afterimage within one frame image sufficiently remains in the human eye due to very-high-speed scanning. Such an afterimage phenomenon allows a driver to perceive the afterimage as an image projected onto an "image display area" as a display area. In actuality, the image having been displayed on the screen 30 is reflected by the concave mirror 40 and the front windshield 50 and the image is perceived as a virtual image by a driver in the image display area. In such a mechanism, the light emission of the LD may be stopped when no image is displayed. In other words, the brightness can be substantially set to 0 for any place other than the place in which a virtual image is displayed in the image display area.

More specifically, the image-forming position of a virtual image formed by the HUD 100 is any position within the image display area in which the virtual image can be formed. Such an image display area is determined according to the design specifications for the HUD.

As described above, the laser scanning system is adopted in the present embodiment. This allows switching off the LD or reducing the amount of light of the LD for portions not to be displayed (hidden).

In the panel system, in which an intermediate image is expressed by the imaging device, such as a liquid crystal display (LCD) and a digital micro-mirror device (DMD), completely hiding the images is difficult even in a black display mode due to the properties of the LCD and the DMD in which the entire panel is illuminated. This causes misadjusted black level. However, the laser scanning system can prevent such a misadjusted black level (black floating).

Figure 6:
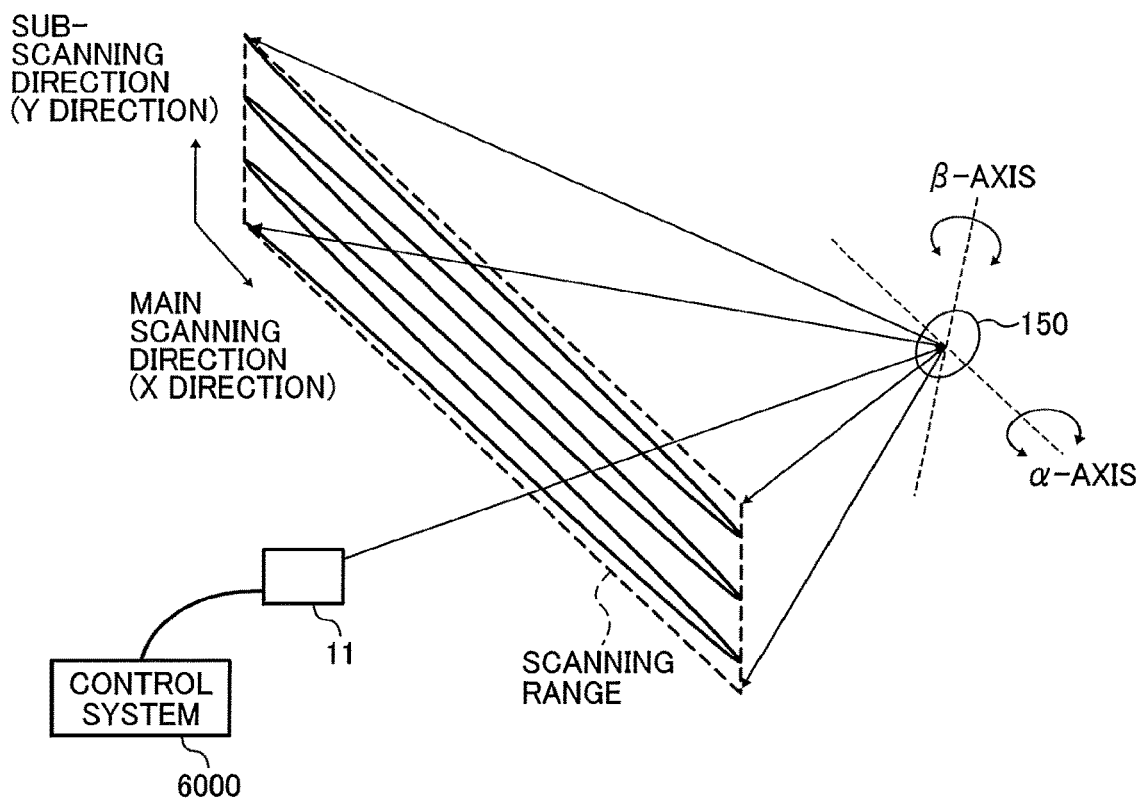
FIG. 6 is an illustration of the corresponding relation between a mirror of the light deflector and the scanning range.

Note that, the FPGA 600 controls the light-emission intensity, timing of light emission, and received-light waveform of each of the light-emitting elements 111R, 111B, and 111G in the light-source device 11. The LD driver 6111 drives each of the light-emitting elements 111R, 111B, and 111G to emit light. As illustrated in FIG. 6, the light beam, which has been emitted from each of the light-emitting elements 111R, 111B, and 111G and combined into to travel along one optical path, two-dimensionally deflected by the light deflector 15 around the α axis and the β axis. The deflected light beam is reflected by the scanning mirror 20 (see FIG. 1), and the reflected light beam as scanning light scans the screen 30. That is, the scanning light two-dimensionally scans the screen 30.

The scanning light scans (two-way scans) a scanning range of the screen 30 in a vibrating manner along the main scanning direction at a high frequency of approximately from 20,000 to 40,000 hertz (Hz), and one-way scans the scanning range in the sub-scanning direction at a low frequency of approximately a few tens of Hz. That is, the optical scanning system performs a raster scan. In so doing, controlling light emission of each light-emitting element (111B, 111R, and 111G) according to a scanning position (the position of the scanning light) allows writing an image and displaying a virtual image for each pixel.

The length of time to write an image in one frame, that is, the length of time for the scanning light to scan one frame (one cycle of two-dimensional scanning), is a few tens of millisecond (msec), determined by the above-described frequency of a few tens of Hz for the sub-scanning direction (sub-scanning frequency). For example, with a frequency of 20,000 Hz for the main-scanning direction (main-scanning frequency) and a sub-scanning frequency of 50 Hz, scanning for one frame takes 20 msec.

Figure 7:
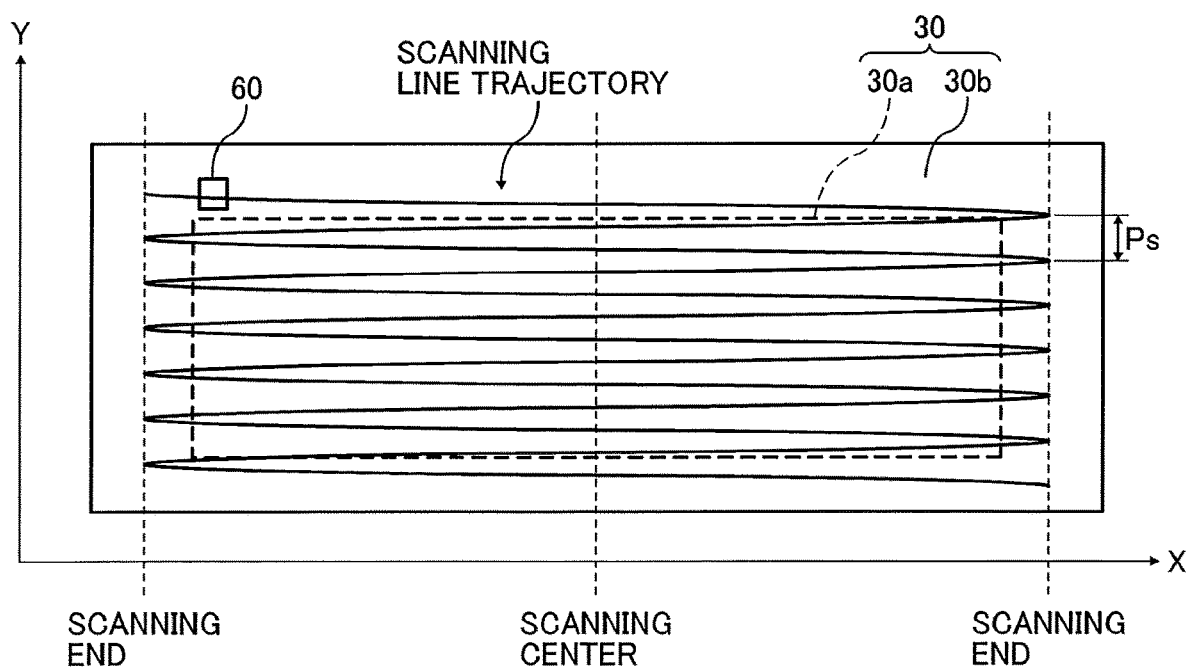
FIG. 7 is an illustration of an example of a trajectory of a scanning line when two-dimensional scanning is performed, according to an embodiment of the present disclosure.

As illustrated in FIG. 7, the screen 30 includes an image area 30a (effective scanning area) in which images are written (illuminated with modulated light according to image data). The screen 30 further includes a marginal area 30b that surrounds the image area.

In the present embodiment, the entire area to be scanned by the light deflector 15 is referred to as a "scanning range". In the present embodiment, the scanning range is the combination of the image area 30a and a part of the marginal area 30b (portion around the periphery of the image area 30a). In FIG. 7, the trajectory of the scanning line in the scanning range is indicated by a zigzag line. The number of scanning lines shown in FIG. 7 is less than the actual number for the sake of simplification.

The image area 30a of the screen 30 includes a transmissive element, such as a microlens array, that is capable of diffusing light. In the present embodiment, the image area 30a is rectangular and planar as illustrated in FIG. 7. However, no limitation is intended thereby. In some embodiments, the image area 30a may be polygon or curved. Alternatively, in some embodiments, the screen 30 may be a flat plate or curved plate that is incapable of diffusing light. Further, in some embodiments, the image area 30a may be a reflective element, such as a micromirror array, that is capable of diffusing light according to the design of the HUD 100.

Figure 8A:
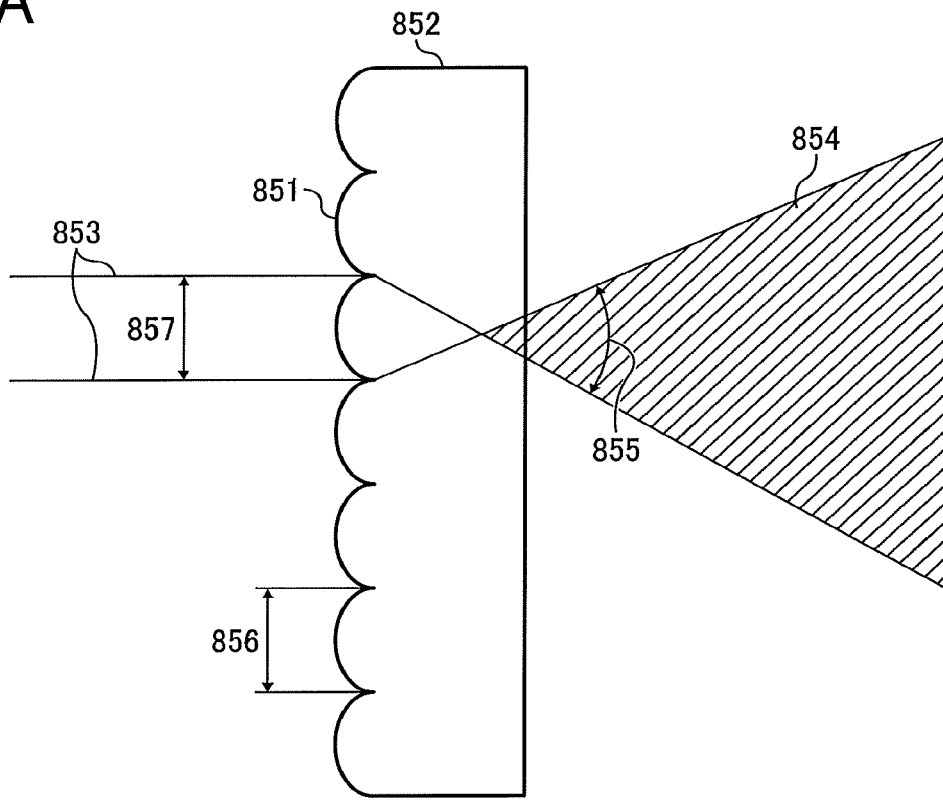
FIGS. 8A and 8B describe a difference in operation with changes in a laser-beam diameter and a lens diameter in a microlens array.
Figure 8B:
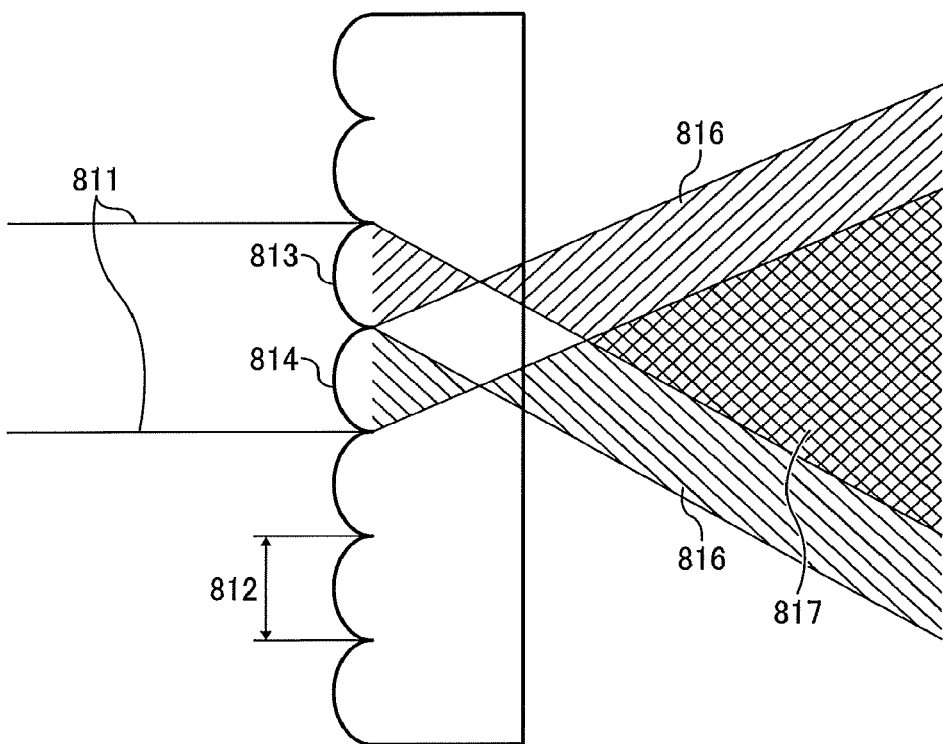

The following describes diffusion and coherent noise that occurs in a microlens array used in the image area 30a of the screen 30 referring to FIGS. 8A and 8B.

FIG. 8A illustrates a microlens array 852. The microlens array 852 has a micro-convex lens structure in which micro-convex lenses 851 are arranged. A laser-beam diameter 857 of a pixel displaying beam 853 is smaller than a size 856 of each micro-convex lens 851. In other words, the size 856 of each micro-convex lens 851 is larger than the laser-beam diameter 857. Note that, the pixel displaying beam 853 according to the present embodiment is a laser beam and has a light intensity distribution of a Gaussian distribution around the center of the laser beam. Accordingly, the laser-beam diameter 857 is a distance in the radial direction of a laser beam where the light intensity in the light intensity distribution decreases to "1/e2".

In FIG. 8A, the laser-beam diameter 857 is drawn to have a size equal to the size 856 of each micro-convex lens 851. However, in some embodiments, the laser-beam diameter 857 may not be equal to the size 856 of the micro-convex lens 851. The light-beam diameter 857 is satisfactory as long as its size does not exceed the size 856 of each micro-convex lens 851.

In FIG. 8A, the entire pixel displaying beam 853 is incident on one micro-convex lens 851 and is converted to a diffused laser beam 854 having a divergence angle 855. Note that the "divergence angle" may be referred to as a "diffusion angle" in some cases.

In FIG. 8A, one laser beam is diffused (the diffused laser beam 854) without any interfering laser beam, and thus no coherent noise occurs. Note that the size of the divergence angle 855 may be set by adjusting the shape of the micro-convex lens 851 as appropriate.

In FIG. 8B, the laser-beam diameter of the pixel displaying beam 811 is twice the array pitch 812 of the micro-convex lenses, and the pixel displaying beam 811 enters both micro-convex lenses 813 and 814. In this case, the pixel displaying beam 811 passes through the two micro-convex lenses 813 and 814, thereby separating into two laser beams 815 and 816 each of which diverges. The two laser beams 815 and 816 overlap each other in an area 817 to interfere with each other therein, so that coherent noise occurs.

Referring to FIG. 7, a synchronous detection system 60 including light-receiving elements is disposed outside (the part of the marginal area 30b) the image area 30a in the scanning range. In the present embodiment, the synchronous detection system 60 is disposed on the +Y side of the corner of −X side and +Y side of the image area 30a. Hereinafter, the main-scanning direction of the screen 30 is referred to as the X direction, and the sub-scanning direction of the screen 30 is referred to as the Y direction.

The synchronous detection system 60 detects the operation of the light deflector 15 and outputs, to the FPGA 600, a synchronization signal to determine the timing of starting scanning and the timing of terminating scanning.

Display of Direction Information

In the HUD 100, the image data generator 804 generates, based on navigation information output from the external data input unit 802, data (hereinafter, referred to as "direction information") that indicates a traveling direction to be followed by a vehicle (the traveling direction in which the vehicle is to move on) such that the direction information is superimposed on a road surface in the road ahead of the vehicle that is to run through the road surface. The direction information is displayed to be superimposed on the road surface ahead of the vehicle, which allows a driver of the vehicle to recognize the direction to be taken in real time without having to look away from the sight in front.

The imaging unit 806 draws and displays some of the direction information generated by the image data generator 804 within the image display area, using a display device that includes the optical scanning device 10, the screen 30, and the concave mirror 40. That is, the HUD 100 displays some information, which falls within a predetermined angle, of view of the entire direction information generated by the image data generator 804. Displaying some information as a recognizable image within the image display area to be superimposed on the road ahead of the vehicle allows the driver to recognize the direction to be followed without having to look away from the road ahead of the vehicle. This configuration can prevent a reduction in driver safety due to inattentive driving, and can reliably lead the driver in an appropriate traveling direction.

Figure 9:
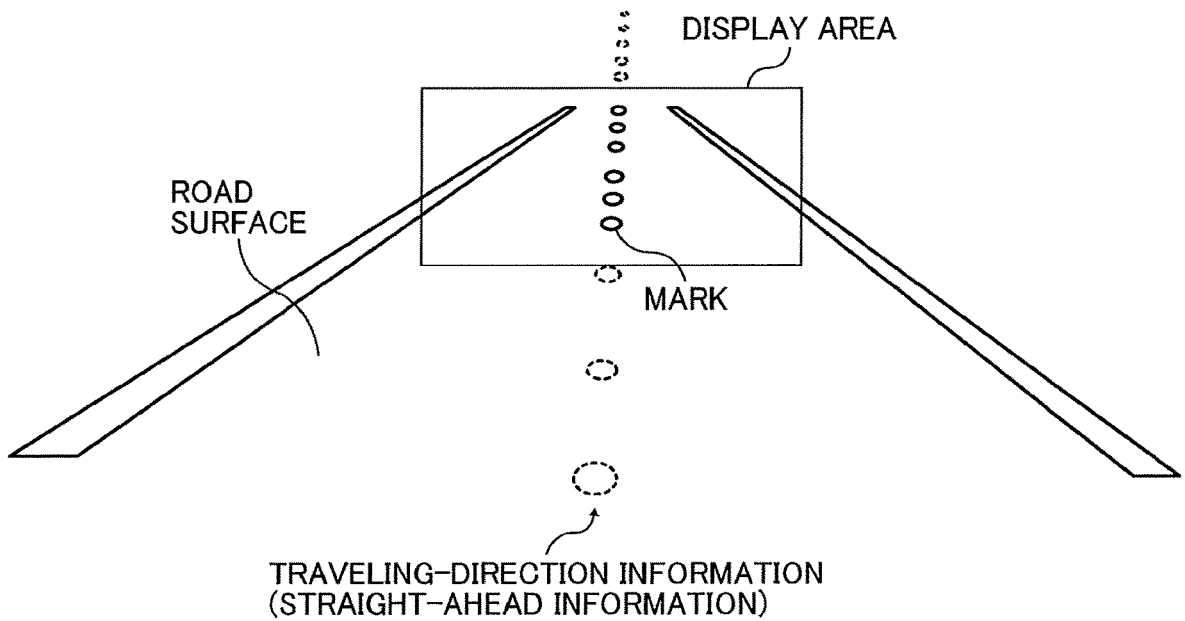
FIG. 9 is an illustration of an example in which some of direction information (straight-ahead information) generated to be superimposed on a road surface ahead of a vehicle is displayed within a display area as a virtual image.

For example, FIG. 9 illustrates a sequence of a plurality of marks (circles depicted by a solid line and a broken line) in a straight line that represents the direction information to instruct the driver to go straight ahead. In this case, the image data generator 804 draws and displays only some marks (six circles represented by solid lines in FIG. 9) of the plurality of marks in line within the display area in the road ahead of the vehicle. Note that at least two marks in the same line constitute the straight-ahead information.

In this configuration, the plurality of marks in line are displayed within the image display area, which provides information instructing the driver to go straight ahead. Thus, the information displayed within the display area allows the driver to recognize the traveling direction to be followed ("go straight ahead" in the case of FIG. 9) without having to look away from the road ahead of the vehicle. Note that the plurality of circles (marks) that constitute the direction information are displayed in decreasing size in a direction from the near side toward the far side of the driver to express depth dimension (thus providing a sense of perspective).

Figure 10:
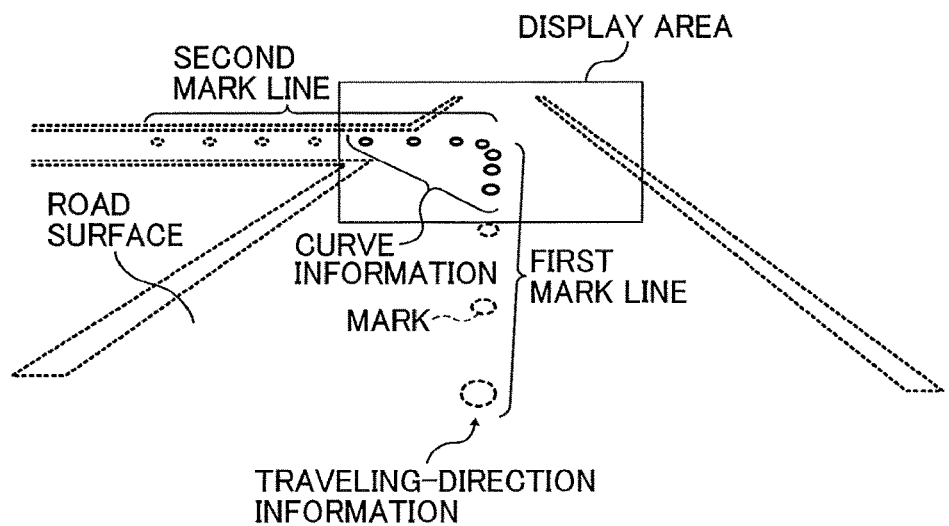
FIG. 10 is an illustration of another example in which some of direction information (curve information) generated to be superimposed on a road surface ahead of a vehicle is displayed within the display area as a virtual image.

For another example, FIG. 10 illustrates the direction information that includes curve information to instruct the driver to make a left. The curve information includes a first mark line and a second mark line. The first mark line includes a sequence of a plurality of marks (three circles indicated by solid lines and three different circles indicated by broken lines in FIG. 10) in a straight line. The second mark line includes a sequence of a plurality of marks (four circles indicated by solid lines and four different circles indicated by broken lines in FIG. 10) in a straight line. The second mark line extends to be perpendicular to (form an angle of 90 degrees relative to) the first mark line, thereby forming a line bent to the left with an angle of 90 degrees. At least three marks, which are not in the same line, may constitute the "curve information".

In other words, the direction information illustrated in FIG. 10 includes the curve information in an L shape made of a plurality of marks (seven circles indicated by solid lines in FIG. 10). The curve information can be displayed within the display area as long as the road surface, on which the display area is superimposed, is away from the vehicle to some extent. This configuration displays information within the display area to instruct the driver to turn to the left at the next intersection. The information displayed within the display area allows the driver to recognize the traveling direction to be followed ("turn to the left" in the case of FIG. 10) without having to look away from the road ahead of the vehicle.

Figure 11:
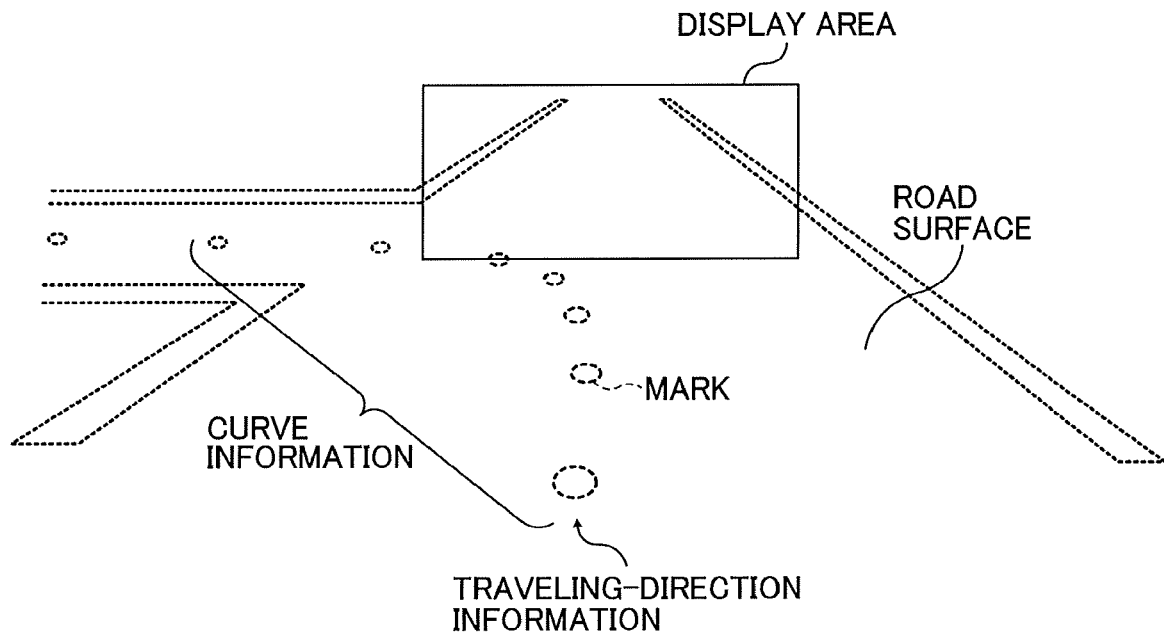
FIG. 11 is an illustration of still another example in which curve information included in direction information generated to be superimposed on a road surface ahead of a vehicle is displayed outside the display area.

However, as illustrated in FIG. 11 for another example, curve information is not displayed within the display area, but is displayed outside the display area when a vehicle approaches the road surface, on which an L-shaped curve information (seven circles indicated by broken lines) is superimposed, or when the curve information is displayed on the right or left side of the road ahead of the vehicle. In such a situation, the driver looks away from the road ahead of the vehicle to watch, for example, the screen of a car navigation system, or pays attention to the voice navigation, to check the traveling direction to be followed. This might result in failure to secure safety of the driver or lead the driver in an appropriate direction.

Figure 12:
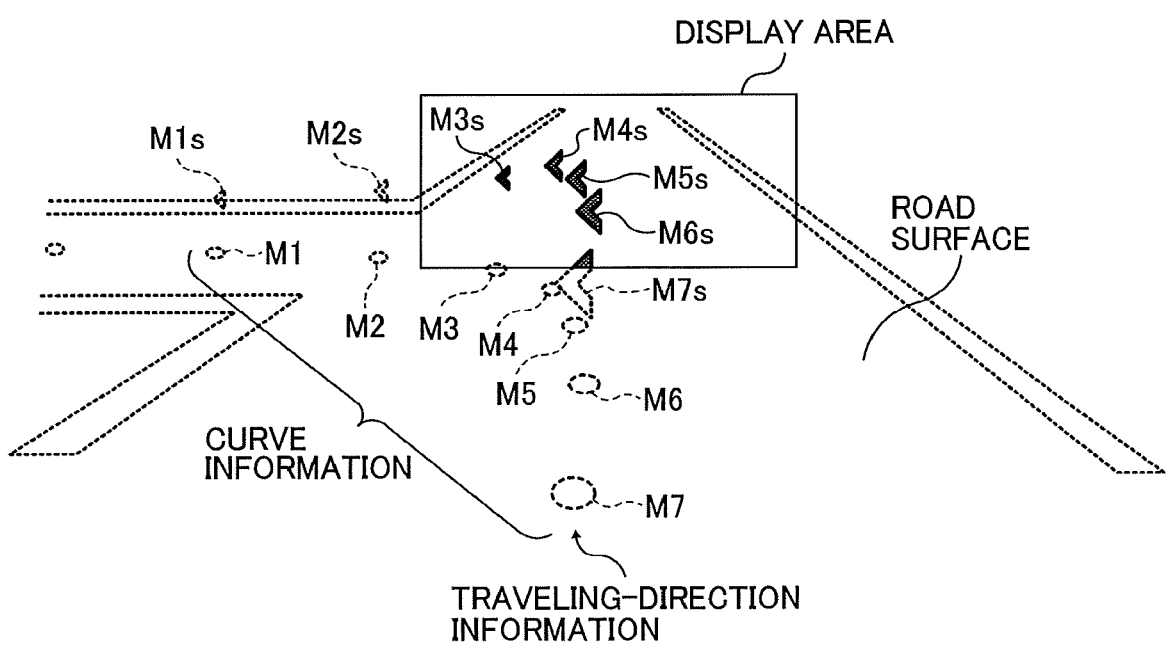
FIG. 12 is a diagram for describing an information display method according to an embodiment of the present disclosure.
Figure 13:
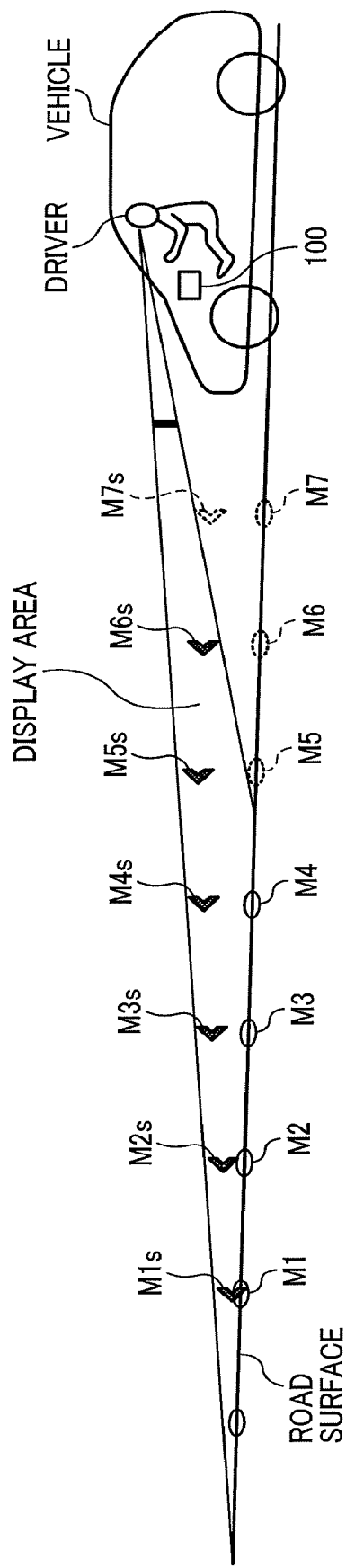
FIG. 13 is a diagram for describing an information display method according to another embodiment of the present disclosure.

In the present embodiment, as illustrated in FIGS. 12 and 13, the image data generator 804 determines whether the curve information falls within the display area when the direction information includes the curve information. When determining that the curve information fails to fall within the display area, the image data generator 804 shifts the curve information into the display area. FIG. 12 is a front view from a driver's seat of a vehicle, and FIG. 13 is a side view from a driver's seat of a vehicle.

More specifically, the image data generator 804 sequentially shifts the plurality of marks (for example, seven circles) that constitute the curve information superimposed on the road surface, upward. As illustrated in FIG. 12, the image data generator 804 sequentially shifts M1 to M1$s$, M2 to M2$s$, M3 to M3$s$, M4 to M4$s$, M5 to M5$s$, M6 to M6$s$, and M7 to M7$s$ where M1 through M7 represent marks arranged in a direction from the far side to the near side of the driver before shifted by the image data generator 804, and M1$s$ through M7$s$ represent marks shifted by the image data generator 804.

In this case, the image data generator 804 dynamically changes the amount of shift between a mark and a corresponding road surface on which the mark is superimposed. That is, the image data generator 804 gradually increases the amount of shift in a direction from the far side toward the near side of the driver. Accordingly, the image data generator 804 allows the driver to intuitively understand the relation of a mark and a road surface on which the mark is superimposed. Thus, the image data generator 804 can reliably alert the driver to the appropriate traveling direction.

This configuration can facilitate an understanding of the relations of marks before and after shifting, and does not cause a feeling of strangeness as compared to the case in which shifting is not performed.

In this configuration, the shape (circle) of the marks before shifted is different from the shape (a gull-wing shape) of the shifted marks. Accordingly, the driver can recognize that the marks are shifted. The marks (in the gull-wing shape in the present embodiment) after shifted gradually decrease in size in a direction from the near side toward the far side of the driver, thereby expressing depth dimension.

In other words, the configuration according to the present embodiment can shift direction information from a road surface, on which the direction information is superimposed, to display the direction information within a display area when a sufficient amount of information cannot be displayed within the display area to allow the driver to recognize the appropriate traveling direction.

In some cases, e.g., immediately before a vehicle approaches the intersection, even shifting a plurality of marks that constitute the curve information fails to display a sufficient amount of information within the display area due to a narrow field of angle.

To handle such a case, the curve information is preferably displayed at a position shifted outward (roundabout curve) from an original position of the curve information superimposed on the road surface.

Figure 14A:
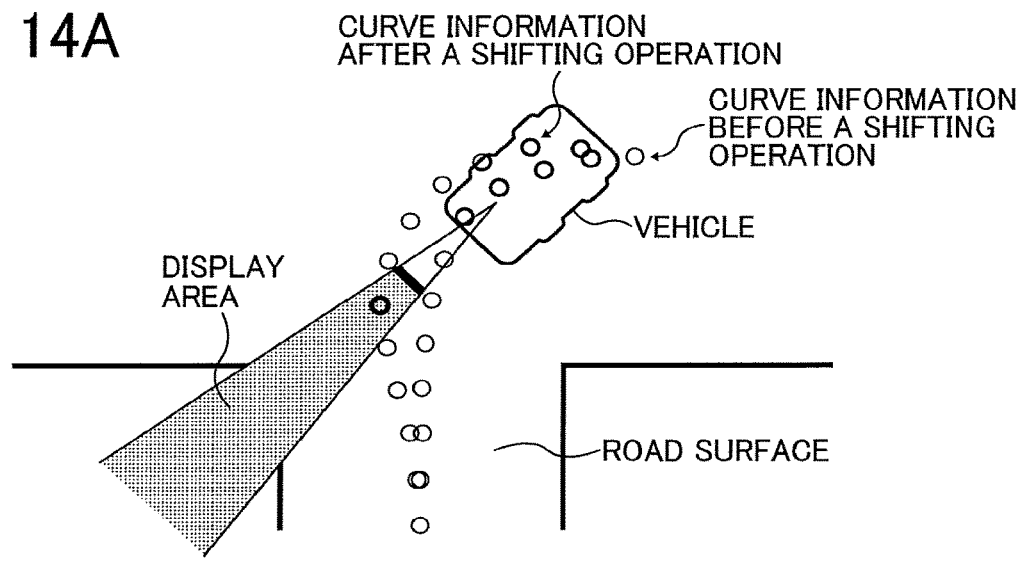
FIG. 14A is an illustration of the relation between the display area and curve information before and after shifting immediately before a vehicle completes turning to the left.
Figure 14B:
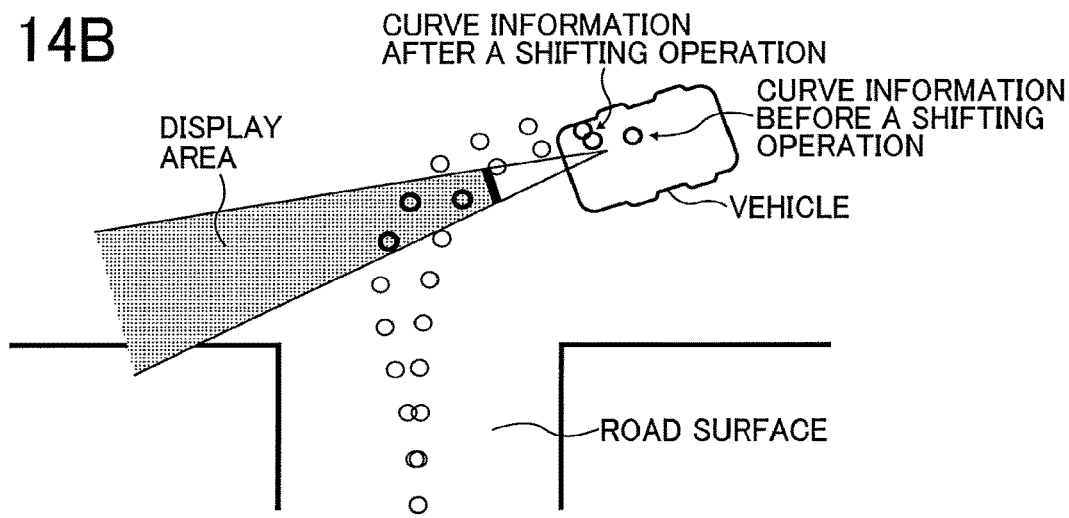
FIG. 14B is an illustration of the relation between the display area and curve information before and after shifting immediately after the vehicle starts turning to the left.
Figure 14C:
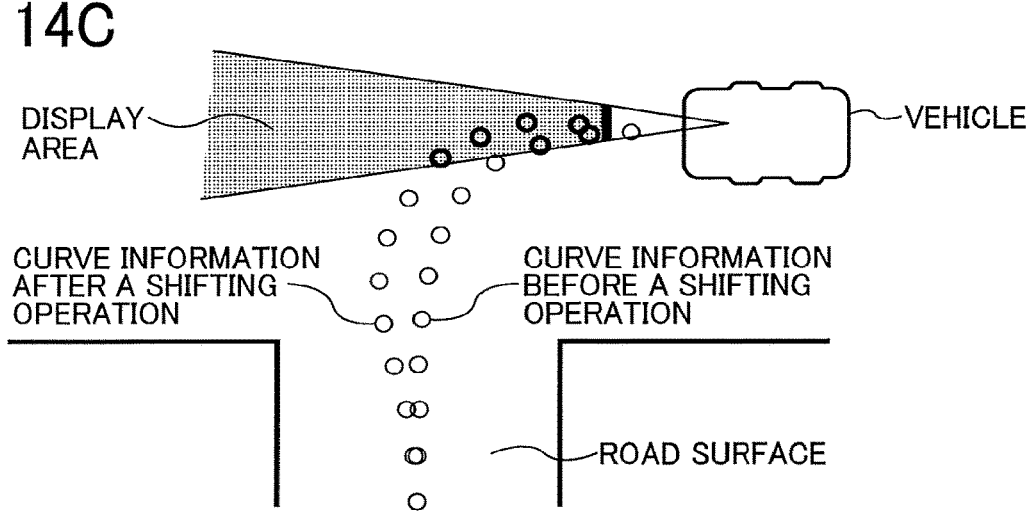
FIG. 14C is an illustration of the relation between the display area and curve information before and after shifting immediately before the vehicle starts turning to the left.

That is, the plurality of marks that constitute curve information are preferably shifted upward and to the opposite direction (shifted up to the right in the case of turning to the left) of the center of curvature of the curve information (see FIGS. 14A, 14B, and 14C). FIG. 14A represents a state immediately before a vehicle completes turning to the left. FIG. 14B represents a state immediately after the vehicle starts turning to the left. FIG. 14C represents a state immediately before the vehicle starts turning to the left.

As can be found from FIGS. 14A, 14B, and 14C, the curve information is deviated right or left from the display area when viewed from the driver in the state immediately before the vehicle starts turning to the left to the state immediately before the vehicle completes turning to the left. To handle such circumstances, the curve information is displaced (shifted) upward and outward, thereby displaying a sufficient amount of information within a limited display area to allow the driver to recognize a traveling direction.

As described above, when a road surface (hereinafter, referred to also as a "superposition target"), on which direction information is superimposed, is within an angle of view of the HUD 100 as viewed from the driver, the HUD 100 allows the driver to easily understand the relation between the direction information and the superposition target in an intuitive manner.

However, when the superposition target (the road surface on which direction information is superimposed) is outside the angle of view of the HUD 100, the HUD 100 shifts the direction information into the angle of view of the HUD 100 to display the direction information within the angle of view of the HUD 100. Thus, in displaying information to be superimposed on a road surface, the HUD 100 shifts the information superimposed on a road surface into the angle of view of the HUD 100 as appropriate, thus displaying the information within a limited angle of view of the HUD 100.

However, the operation of "shift" (shifting) might hamper understanding of the relation between the information and the superimposition target.

To avoid such difficulties, the HUD 100 dynamically changes the amount of shift during the process in which the superimposition target (road surface on which direction information is superimposed) moves from the inside to the outside of the angle of view of the HUD 100, thus facilitating understanding of the relation between the direction information and the superimposition target. Thus, dynamically changing the amount of shift can facilitate the understanding the relation between the direction information shifted and the superimposition target.

Thus, the HUD 100 according to the present embodiment displays information within the range of the angle of view of the HUD 100, instead of superimposing the information on a road surface outside the angle of view of the HUD 100, i.e., Augmented Reality (AR) display. Thus, the HUD 100 according to the present embodiment can display a sufficient amount of information to allow the driver to recognize an appropriate traveling direction within a limited angle of view.

In the above-described cases, curve information for turning to the left with a curvature of a substantially right angle are described, for example. Alternatively, curve information for turning to the right with a curvature of a substantially right angle or curve information for turning to the left or right with a curvature of a blunt angle or a sharp angle may be applicable.

Figure 15:
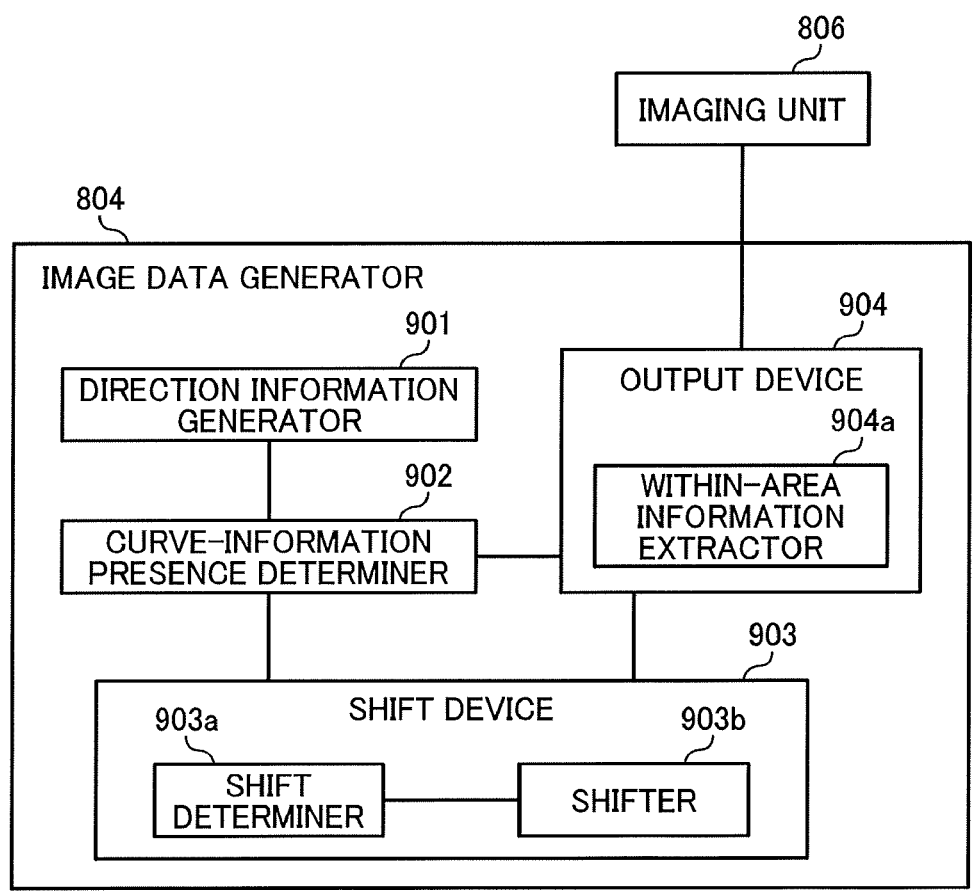
FIG. 15 is a block diagram of a configuration example of an image data generator.

FIG. 15 is a block diagram of a configuration example of the image data generator 804. The image data generator 804 includes a direction information generator 901, a curve information presence determiner 902, a shift device 903, and an output device 904.

The direction information generator 901 generates direction information that represents a traveling direction in which a vehicle is to move on based on navigation information output from the external data input unit 802 and displays the generated direction information to be superimposed on a road surface ahead of the vehicle. Then, the direction information generator 901 outputs the generated direction information to the curve information presence determiner 902. More specifically, the direction information generator 901 generates direction information along a road surface ahead of a vehicle based on the navigation information, such as information regarding a route along which the vehicle is to travel, output from, e.g., the external data input unit 802.

The curve information presence determiner 902 determines whether the direction information input includes curve information. When an affirmative determination is made, the curve information presence determiner 902 outputs a notification that says "curve information is present" and direction information to the shift device 903. When a negative determination is made, the curve information presence determiner 902 outputs direction information to the output device 904.

The shift device 903 includes a shift determiner 903*a* and a shifter 903*b*.

The shift determiner 903*a* determines whether the curve information is outside the display area upon receiving the notification that curve information is present and the direction information. When an affirmative determination is made, the shift determiner 903*a* determines that a shifting operation is necessary and outputs a notification that "shifting is to be performed" and the direction information to the shifter 903*b*. When a negative determination is made, the shift determiner 903*a* determines that the shifting operation is not necessary and outputs the direction information to the output device 904.

The shifter 903*b* shifts at least some of the curve information (at least one mark) into the display area upon receiving the notification that a shifting operation is necessary and the direction information. Then, the shifter 903*b* outputs the direction information including the shifted curve information to the output device 904.

The output device 904 has a within-area information extractor 904*a*. The within-area information extractor 904*a* extracts, from the input direction information, information that falls within the display area. The output device 904 outputs the extracted information as an image data to the imaging unit 806.

Figure 16:
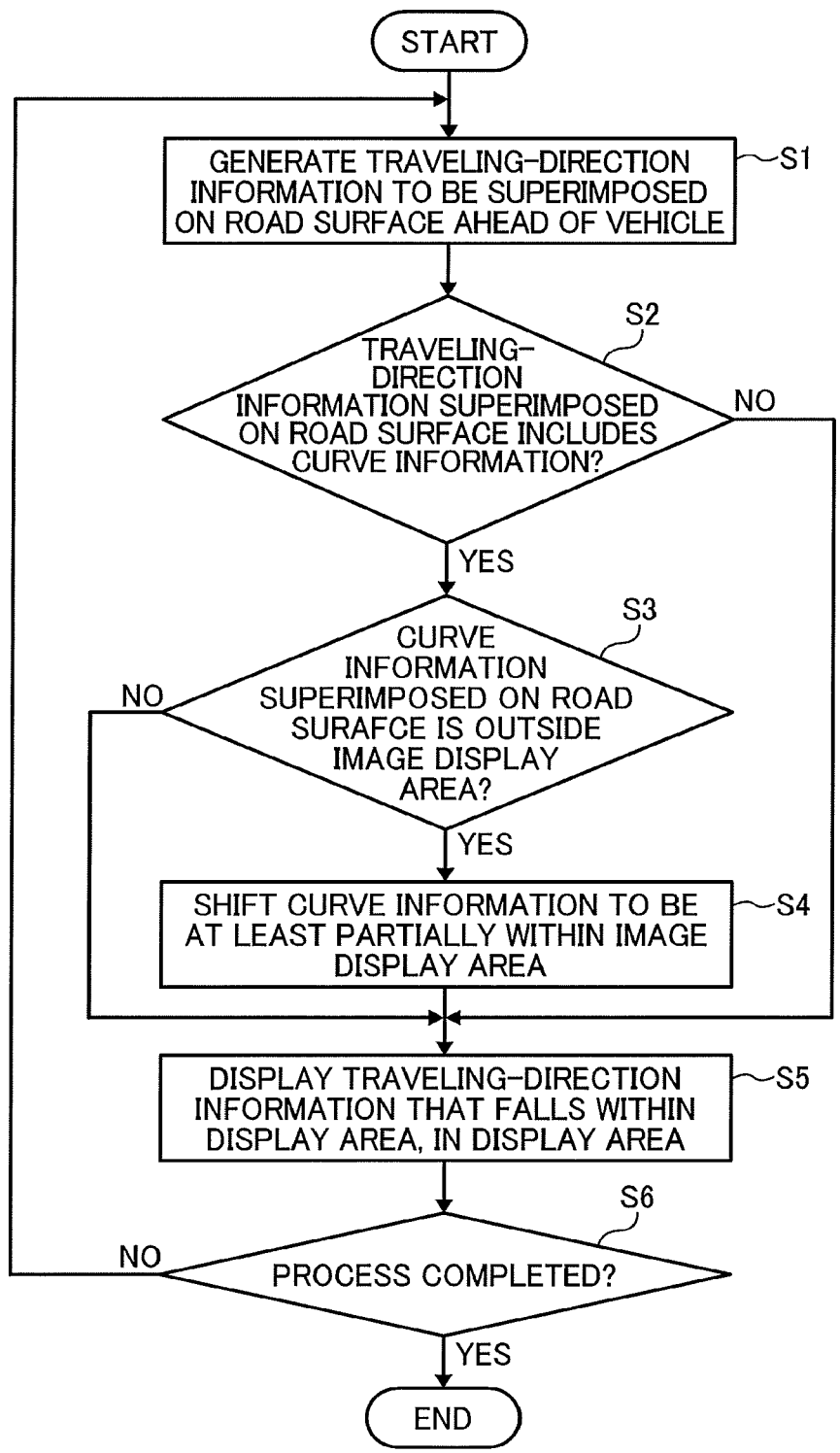
FIG. 16 is a flowchart of an image display process.

The FPGA 600 controls the LD driver 6111 to control the LD (the light-source device 11) while controlling the MEMS controller 615 to control the light deflector 15 according to the input image data, thus displaying a virtual image according to the image data, within the display area. The following describes an information display process using the HUD 100, referring to FIG. 16. FIG. 16 is a flowchart of a series of computational algorithms executed by the FPGA 600 according to the present embodiment. The information display process starts when the electrical system of, for example, a vehicle mounted with the HUD 100 is turned on.

In step S1, the HUD 100 generates direction information to be superimposed on a road surface ahead of a vehicle. More specifically, the HUD 100 generates a sequence of a plurality of marks that constitute the direction information to be superimposed on a road surface through which a vehicle is to travel.

In step S2, the HUD 100 determines whether the direction information superimposed on the road surface includes curve information. When an affirmative determination is made in step S2, the process goes to step S3.

In step S3, the HUD 100 determines whether the curve information superimposed on the road surface is outside the display area. More specifically, such a determination is performed based on the distance from a vehicle to the road surface on which curve information is superimposed or the position of the road surface (the position along the right and left directions). For example, when the distance from the vehicle to the road surface of the superimposition target (the road surface on which the curve information is superimposed) is less than a first distance, the HUD 100 determines that the curve information is outside the display area. When the distance from the vehicle to the road surface of the superimposition target is greater than or equal to a second distance that is greater than or equal to the first distance, the HUD 100 determines that the curve information is within the display area.

Note that the distance from the vehicle to the road surface on which the curve information is superimposed is obtained from, e.g., the car navigation system. Alternatively, a range-finding device, such as a light detection and ranging (LiDAR) device, a millimeter-wave radar, a monocular camera, and a stereo camera, for use in auto-braking and auto-steering to avoid danger may be used to obtain such a distance when the LiDAR is mounted on a vehicle. When an affirmative determination is made in step S3, the process goes to step S4. When a negative determination is made in step S3, the process proceeds to step S5.

In step S4, the HUD 100 shifts the curve information such that at least some (at least one mark) of the curve information falls within the display area. When step S4 is completed, the process proceeds to step S5.

In step S5, the HUD 100 displays, among the direction information, the information that falls within the display area, in the display area. More specifically, when a negative determination is made in step S2, the HUD 100 displays some marks of the straight-ahead information in the display area. When an affirmative determination is made in step S2 and a negative determination is made in step S3, the HUD 100 displays all of the marks of the curve information in the display area. When an affirmative determination is made in step S2, an affirmative determination is made in step S3, and the process proceeds to step S4, the HUD 100 displays at least some of the curve information (at least one mark) in the display area.

In step S6, the HUD 100 determines whether the process is completed. When an affirmative determination is made in step S6, the process ends. When a negative determination is made in step S6, the process returns to step S1.

The above-described HUD 100 according to the present embodiment, which is mounted on a vehicle, displays information as a virtual image within a predetermined display area. The HUD 100 includes a direction information generator 901, a shift device 903, and a display system. The direction information generator 901 generates direction information that represents a traveling direction to be followed by the vehicle to superimpose the generated direction information on a road surface ahead of the vehicle. The shift device 903 shifts at least some of curve information that informs a driver of a traveling direction to take a curve, to be displayed within the display area when the direction information includes the curve information and the curve information is outside the display area. The display system includes the FPGA 600, the optical scanning device 10, the screen 30, and the concave mirror 40 to display, as the virtual image, information that falls within the display area, in the display area among the direction information.

This configuration allows at least some of the curve information to be displayed within the display area when the direction information includes the curve information.

That is, the HUD 100 according to the present embodiment can reliably display at least some of the curve information within the display area.

The direction of shift (shift direction) of the curve information preferably includes a component of an upward direction. This is because curve information superimposed on a road surface is preferably shifted upward to some extent to allow the curve information to fall within the display area (see FIGS. 12 and 13).

Preferably, the shift device 903 increases in amount of upward shift as the distance from the vehicle to the road surface as the superimposition target decreases.

This configuration can reliably shift the curve information into within the angle of view of the HUD 100 (see FIGS. 12 and 13).

Alternatively, in some embodiments, the amount of upward shift may be uniform over the entire curve information.

Further, the direction of shift (shift direction) of the curve information preferably further includes a component of a direction away from the center of curvature of the curve information.

This configuration can sufficiently display the curve information within the display area.

Preferably, the shift device 903 increases in the amount of shift in the above-described direction away from the center of curvature of the curve information as the curvature of the curve information increases.

This configuration can sufficiently display the curve information within the display area.

Preferably, the shift device 903 determines whether the curve information is outside the display area based on the distance from a vehicle to a road surface on which the curve information is superimposed. Note that, the curve information is more likely to be outside the display area as the distance decreases.

This configuration can relatively facilitate determining whether the curve information is outside the display area.

Preferably, the shift device 903 determines whether the curve information is outside the display area based on the curvature of the curve information. Such a determination can be performed by, e.g., the shift determiner 903a. Note that, the curve information is more likely to be outside the display area as the curvature of the curve information increases.

This configuration can relatively facilitate determining whether the curve information is outside the display area.

The direction information superimposed on a road surface ahead of a vehicle is a sequence of a plurality of marks. When the direction information includes curve information, at least two of the plurality of marks constitute the curve information. In shifting the curve information, the shift device 903 preferably shifts at least two marks of the curve information in order of decreasing distance between a superimposed position on the road surface and the vehicle, to the inside of the display area.

This configuration allows the driver to easily understand the relation of a mark before shifting and a shifted mark in an intuitive manner, thus reducing the driver's feeling of strangeness about shifted curve information.

Alternatively, in some embodiments, the shift device 903 may shift the above-described at least two marks in order of increasing distance between a road surface on which a mark is superimposed and a vehicle. Alternatively, in some embodiments, the shift device 903 may shift the above-described at least two marks into within the display area at the same time.

The above-described at least two marks preferably change in shape before and after shifting.

This configuration can facilitates distinguishing between a mark superimposed on a road surface before shifting and the mark shifted away from the road surface.

Alternatively, in some embodiments, the above-described at least two marks may have a shape in common before and after shifting. In this case, the above-described at least two marks may differ in size before and after shifting.

Alternatively, in some embodiments, the above-described two marks shifted by the shift device preferably decrease in size in order of increasing distance between a superimposed position on the road surface and the vehicle, in a gradual manner.

This configuration can express the depth dimension for the above-described at least two marks, allowing the driver to easily recognize the curve information shifted by the shift device 903.

Preferably, when the direction information further includes straight-ahead information that forms a sequence between the straight-ahead information and the curve information, the shift device 903 shifts the curve information such that the sequence between the curve information and the straight-ahead information is maintained.

This configuration can maintain the sequence of the direction information, preventing the driver from being confused due to difficulty in understanding the direction information.

Preferably, the direction information is generated by the image data generator 804 based on information from a device having a global positioning system (GPS), such as a car navigation device. Examples of the device having the GPS may include, for example, a terminal having the GPS, such as a smartphone or a tablet personal computer (PC), in addition to the car navigation device.

In this configuration, the direction information is generated based on information, such as information regarding a route from a departure place to a destination to be traveled by a vehicle, obtained from the device having the GPS. Thus, the reliability of the direction information can be maintained.

Alternatively, in some embodiments, the direction information may represent a traveling direction to be followed by a vehicle in automated driving.

This configuration can display information that gives a traveling direction to be followed to a passenger in a vehicle.

The display device includes an image-light generator and the concave mirror 40 as an optical system. The image-light generator includes the optical scanning device 10 and the screen 30 to generate image light according to the above-described input information. The concave mirror 40 guides the generated image light to the front windshield 50 as a transmission and reflection member.

Further, a vehicle device including the HUD 100 and a vehicle, such as a car, on which the HUD 100 is mounted, can reliably instruct a driver of the vehicle in an appropriate traveling direction to be followed, thus preventing mistaking the traveling direction.

When the vehicle device further includes a device having the GPS to provide information to the HUD 100 mounted on a vehicle, the direction information (at least one or both of the straight-ahead information and the curve information) can be accurately superimposed on a road surface ahead of the vehicle. Further, the direction information can be accurately displayed within the display area.

An information display method according to the present embodiment includes generating direction information representing a traveling direction to be followed by a vehicle to superimpose the direction information on a road surface ahead of the vehicle; determining whether curve information is outside a display area when the direction information includes the curve information; shifting the curve information to make at least some of the curve information fall within the display area when an affirmative determination is made in the determining; and displaying the direction information in a part that falls within the display area, as a virtual image within the display area.

This configuration allows at least some of the curve information to be displayed within the display area when the direction information includes the curve information.

That is, the HUD 100 according to the present embodiment can reliably display at least some of the curve information within the display area.

Figure 17:
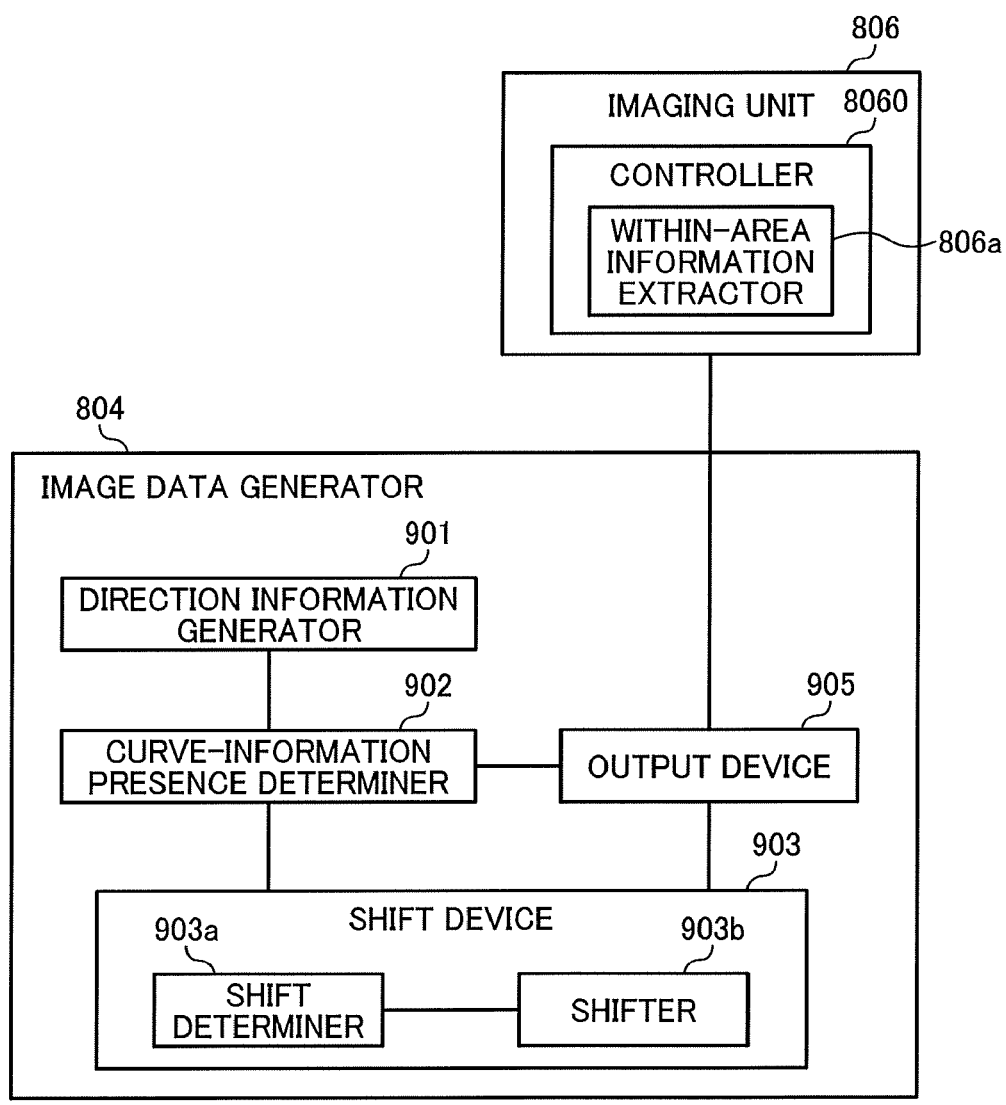
FIG. 17 is a block diagram of another configuration example of the image data generator.

In the above-described embodiment, the output device 904 of the image data generator 804 includes the within-area information extractor 904*a*. Instead of this configuration, the imaging unit 806 may further include a controller 8060 that includes the within-area information extractor 806*a* as illustrated in FIG. 17 as a variation. In such a configuration of FIG. 17, the output device 905 of the image data generator 804 outputs the entire direction information to the controller 8060 of the imaging unit 806. Then, the within-area information extractor 806*a* of the controller 8060 extracts information to fall within the display area, from the entire direction information.

However, the within-area information extractors 904*a* and 806*a* may not be included in the configurations in FIGS. 15 and 17, respectively. This is because shifting some of the direction information superimposed on a road surface that is present outside the display area such that the some of the direction information is positioned within the display area allows imaging some of the direction information in the image area 30*a* and the remaining direction information in the marginal area 30*b*. This can be achieved even if the imaging unit 806 images the entire direction information in the screen 30. Thus, the some of the direction information can be displayed within the display area and the remaining is not displayed within the display area.

The HUD 100 according to the variation, which is mounted on a vehicle, includes a direction information generator 901, a shift device 903, and a display system. The direction information generator 901 generates direction information that represents a traveling direction to be followed by the vehicle to superimpose the generated direction information on a road surface ahead of the vehicle. The shift device 903 shifts at least some of curve information that informs a driver of a traveling direction to take a curve, to be displayed within the display area when the direction information includes the curve information and the curve information is outside the display area. The display system includes the FPGA 600, the optical scanning device 10, the screen 30, and the concave mirror 40 to display, as the virtual image, information that falls within the display area, in the display area among the direction information.

This configuration allows at least some of the curve information to be displayed within the display area when the direction information includes the curve information.

That is, the HUD 100 according to the variation can reliably display at least some of the curve information within the display area.

In the above-described embodiment, cases in which the direction information includes the curve information are described. However, in some embodiments, cases in which the direction information includes, for example, downhill information or uphill information, are also within the present disclosure. That is, in some embodiments, the curve information may be substituted by "downhill information", "uphill information", "information including curve information and downhill information (curved downward slope information)", and "information including curve information and uphill information (curved upward slope information)". The same as in the above-described embodiment applies to those cases as well.

In the present embodiment, the curve information, the uphill information, the downhill information, the information including curve information and uphill information, and the information including curve information and uphill information are all information regarding a change in traveling direction, which is thus referred to as "direction-change information".

The following describes an example in which there is a downward slope ahead of a vehicle, referring to FIGS. 18A, 18B, 19A, and 19B. In the present example, the downward slope refers to a straight downward slope for the sake of simplification.

With the downward slope ahead of the vehicle, at least some marks M1 through M6 (substantially all marks in the present example) of a plurality of marks (for example six marks in the present example) superimposed on a slope area of a road surface (referred to also as a road-surface slope area) are positioned below the display area, thus failing to fall within the display area (see FIGS. 18A and 18B). In this case, the at least some marks M1 through M6 are included in a sequence of a plurality of marks that constitutes direction information.

To handle such circumstances, the six marks M1 through M6 superimposed on the road-surface slope area are shifted upward in a gentle curve or a straight line to be positioned within the display area. Further, the shapes of the marks M1 through M6 are changed from, for example, a circle to a gull-wing shape to obtain shifted marks M1$s$ through M6$s$ (see FIGS. 18A and 18B). The shifted marks M1$s$ through M6$s$ displayed within the display area allows the driver to recognize the direction of slope (downward in the present example) of the slope area of the road surface in advance. Accordingly, the driver can perform a necessary driving operation, for example, reduce the speed in preparation for the slope (downward slope in the present example).

FIG. 18B represents a steeper road-surface slope area than FIG. 18A does. Accordingly, the vertical distance between each position in the road-surface and the display area increases in FIG. 18B, and thereby the amount of shift of the six marks M1 through M6 increases.

Figure 19A:
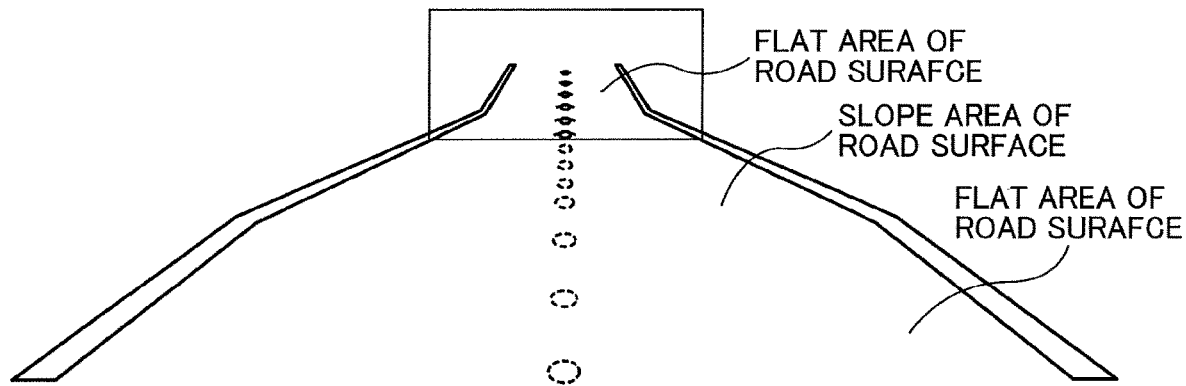
FIG. 19A is an illustration of a case in which there is a downward slope in a road surface according to an example.
Figure 19B:
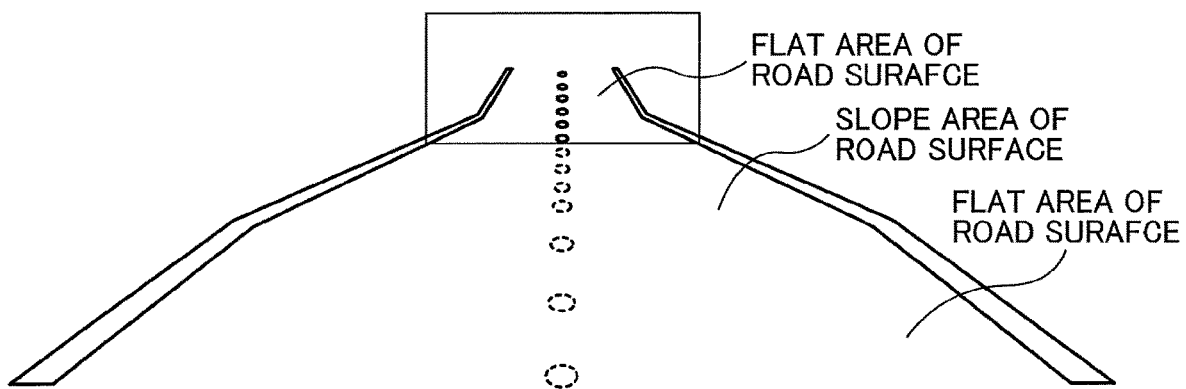
FIG. 19B is an illustration of a case in which there is a downward slope in a road surface according to a comparative example.

FIG. 19A is a front view of a road surface of a downward slope and a display area as viewed from a driver's seat according to an example. FIG. 19B is a front view of a road surface of a downward slope and a display area as viewed from a driver's seat according to a comparative example.

In FIG. 19A as an example, a large number of marks in a gull-wing shape are arranged in a depth direction of the drawing sheet within the display area to represent the direction of slope (downward slope in the present example) of the slope area of the road surface, thereby allowing the driver to recognize the direction of slope of the slope area.

In FIG. 19B as a comparative example, a small number of marks in a circle are arranged in a depth direction of the drawing sheet within the display area. In this case, it is difficult for the driver to recognize the direction of slope of the slope area.

Note that, in both FIG. 19A and FIG. 19B, the marks displayed within the display area decrease in size in a direction from a far side to a near side of the driver, thereby expressing the depth dimension (a sense of perspective).

The following describes another example in which there is an upward slope ahead of a vehicle, referring to FIGS. 20A, 20B, 21A, and 21B. In the present example, the upward slope refers to a straight upward slope for the sake of simplification.

With the upward slope ahead of the vehicle, at least some (substantially all marks in the present example) of a sequence of a plurality of marks M1 through M10 (for example ten marks in the present example) that constitutes a direction information are positioned above the display area, thus failing to fall within the display area (see FIGS. 20A and 20B). In the marks M1 through M10, marks (for example six marks M5 through M10) are superimposed on the slope area of the road surface, and the remaining marks (for example four marks M1 through M4) are superimposed on a flat area that extends from the slope area of the road surface to a position farther than the slope area as viewed from the vehicle.

To handle such circumstances, the ten marks M1 through M10 are shifted downward in a gentle curve or a straight line such that four marks M7 through M10 are positioned within the display area. Further, the shapes of the ten marks M1 through M10 are changed from, for example, a circle to a gull-wing shape to obtain shifted marks M1$s$ through M10$s$. The shifted marks M7$s$ through M10$s$ displayed within the display area allow the driver to recognize the sloping direction (upward slope in the present example) of the slope area of the road surface in advance. Accordingly, the driver can perform a necessary driving operation, for example, increase or reduce the speed in preparation for the slope (upward slope in the present example) the driver is coming to travel through.

FIG. 20B represents a steeper slope area of the road surface than FIG. 20A does. Accordingly, the vertical distance between each position in the road surface and the display area increases in FIG. 20B, and thereby the amount of shift of the ten marks M1 through M10 preferably increases.

In the examples of FIGS. 20A and 20B, all of the ten marks M1 through M10 are shifted downward. However, in some embodiments, for example, only six marks M5 through M10, only five marks M6 through M10, or only four marks M7 through M10 superimposed on the slope area of the road surface may be shifted downward.

Figure 21A:
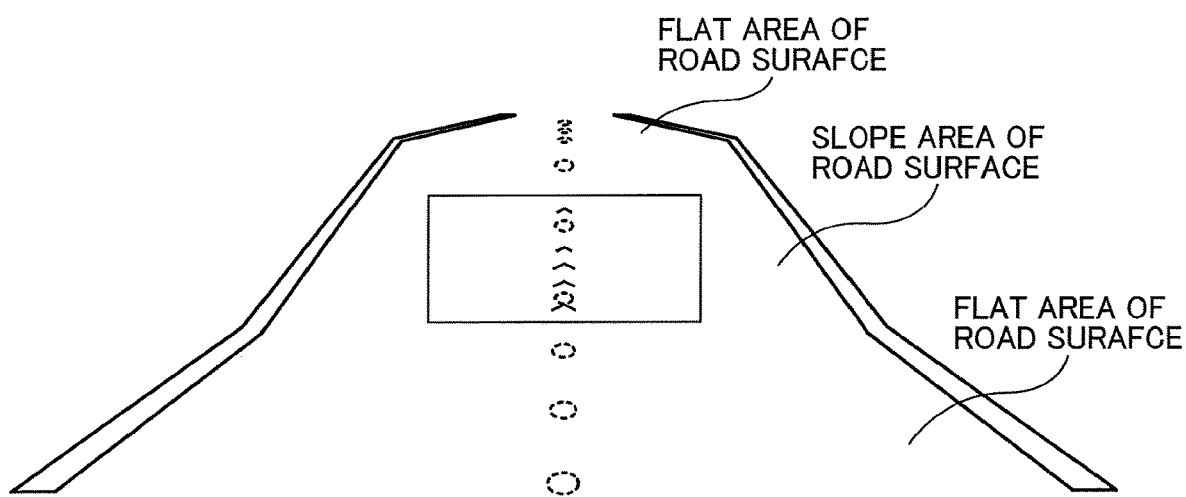
FIG. 21A is an illustration of a case in which there is an upward slope in a road surface according to an example.
Figure 21B:
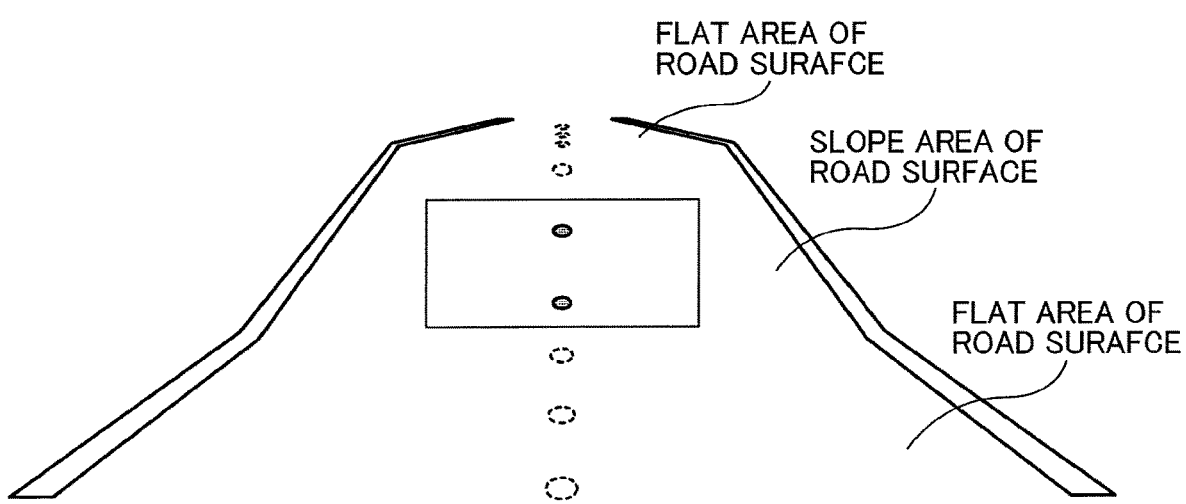
FIG. 21B is an illustration of a case in which there is an upward slope in a road surface according to a comparative example.

FIG. 21A is a front view of a road surface of a upward slope and a display area as viewed from a driver's seat according to an example. FIG. 21B is a front view of a road surface of a upward slope and a display area as viewed from a driver's seat according to a comparative example.

In FIG. 21A as an example, a large number of marks in a gull-wing shape are arranged in a depth direction of the drawing sheet within the display area to represent the direction of slope (upward slope in the present example) of the slope area of the road surface, thereby allowing the driver to recognize the direction of slope of the slope area.

In FIG. 21B as a comparative example, a small number of marks in a circle are arranged in a depth direction of the drawing sheet within the display area. In this case, it is difficult for the driver to recognize the direction of slope of the slope area.

In FIG. 21A, the marks displayed within the display area decrease in size in a direction from the near side to the far side of the driver to represent the depth dimension (a sense of perspective), thereby allowing the driver to easily recognize the direction of slope of the slope area of the road surface.

As can be understood from the above description, the HUD 100 preferably controls the direction of shift or the amount of shift of direction-change information based on the distance from a vehicle to a road surface on which the direction-change information is superimposed, the travel direction to be changed, such as right, left, upward, downward, upward to the right, downward to the right, upward to the left, and downward to the left when the direction information includes any direction-change information.

When the direction-change information includes only the curve information, for example, the HUD 100 preferably controls the amount of shift of the direction-change information based on the distance from a vehicle to a road surface on which the direction-change information is superimposed, with the direction of shift of the direction-change information being upward.

When the direction-change information includes only the downhill information, the HUD 100 preferably controls the amount of shift of the direction-change information based on the degree of slope of the road surface, with the direction of shift of the direction-change information being upward.

When the direction-change information includes only the uphill information, the HUD 100 preferably controls the amount of shift of the direction-change information based on the degree of slope of the road surface, with the direction of shift of the direction-change information being downward.

When the direction-change information includes the curve information and the downhill information (information regarding curved downward slope), for example, the HUD 100 preferably controls the amount of shift of the direction-change information based on the distance from a vehicle to a road surface on which the direction-change information is superimposed and the degree of slope of the road surface, with the direction of shift of the direction-change information being upward.

When the direction-change information includes the curve information and the uphill information (information regarding curved upward slope), for example, the HUD 100 preferably controls the amount of shift and the direction of shift of the direction-change information based on the distance from a vehicle to a road surface on which the direction-change information is superimposed and the degree of slope of the road surface.

As described above, the marks superimposed on the downward slope are more likely to fall outside the angle of view (display area) of the HUD 10. Even when the marks fall within the angle of view, a plurality of marks are gathered within a narrow area or marks in far positions are geometrically displayed to look too small for the driver (see FIG. 19B).

In the above-described example, the marks superimposed on the downward slope are shifted upward to draw an appropriate shape, for example, a gentle downward slope shape, to be appropriately drawn within the angle of view, thereby facilitating the recognition of the number of marks and the size thereof (see FIGS. 18A, 18B, and 19A).

The marks superimposed on the upward slope are more likely to fall outside the angle of view (display area) of the HUD 100. Even when the marks fall within the angle of view, a small number of marks fall within the angle of view (see FIG. 21B).

In the above-described example, the marks superimposed on the upward slope are shifted downward to draw an appropriate shape, for example, a gentle upward slope or a flat shape, to be appropriately drawn within the angle of view, thereby facilitating the recognition of the number of marks and the size thereof (see FIGS. 20A, 20B, and 21A).

The above-described HUD 100 according to the present embodiment, variation, and examples which is mounted on a vehicle, displays information as a virtual image within a predetermined display area. The HUD 100 includes a direction information generator 901, a shift device 903, and a display system. The direction information generator 901 generates direction information that represents a traveling direction to be followed by the vehicle to superimpose the generated direction information on a road surface ahead of the vehicle. The shift device 903 shifts at least some of direction-change information that informs a driver of a traveling direction to be changed, to be displayed within the display area when the direction information includes the direction-change information and the direction-change information is outside the display area. The display system displays, as the virtual image, the direction information within the display area.

This configuration allows at least some of direction-change information to be displayed within the display area when the direction information includes the direction-change information.

The HUD 100 according to the above-described embodiment, variation, and example of the present disclosure can reliably display at least some of direction-change information within the display area.

Preferably, the shift device 903 controls the direction of shift of the direction-change information based on the traveling direction to be changed of the direction-change information.

Further, the direction of shift of direction-change information preferably further includes a component of an upward direction (an upward component) when the direction-change information includes at least one of the curve information and the downhill information.

When the direction-change information includes at least one of the cure information and the uphill information, the direction of shift of the direction-change information preferably includes a component of the upward direction (upward component) or the downward direction (downward component). When the direction-change information includes the cure information and the uphill information, the direction of shift of the direction-change information preferably includes a component of the upward direction or the downward direction for each constituent element (for example, for each mark) of the direction-change information based on the comparison between the amount of shift in the upward direction for the curve information and the amount of shift in the downward direction for the uphill information.

Further, the direction of shift of direction-change information preferably further includes a component of a direction away from the center of curvature of curve information when the direction-change information includes the curve information.

Preferably, the shift device 903 preferably controls the amount of shift of the direction-change information based on at least one of the distance from a vehicle to a road surface on which the direction-change information is superimposed, the degree of slope of the road surface, and the degree of curve (curvature) of the road surface.

Preferably, the shift device 903 determines whether direction-change information is outside the display area based on at least one of the distance from a vehicle to a road surface on which the direction-change information is superimposed, the degree of slope of the road surface, and the degree of curve (curvature) of the road surface.

An information display method according to the above-described embodiment, variation, and example of the present disclosure includes generating direction information representing a traveling direction to be traveled by a vehicle to superimpose the direction information on a road surface ahead of the vehicle; determining whether direction-change information is outside a display area when the direction information includes the direction-change information; shifting the curve information to make at least some of the direction-change information fall within the display area when an affirmative determination is made in the determining; and displaying the direction information in a part that falls within the display area, as a virtual image within the display area.

This configuration allows at least some of direction-change information to be displayed within the display area when the direction information includes the direction-change information.

The information display method according to the above-described embodiment, variation, and example of the present disclosure can reliably display at least some of direction-change information within the display area.

In the above-described embodiment, variation, and example of the present disclosure, a sequence of a plurality of marks is used as the direction information. In some embodiments, one mark may be used as the direction information. As a single mark for use in the direction information, a mark may be, for example, a straight line that represents the straight-ahead information may be used. Alternatively, a mark may be a curve line or a broken line that represents the curve information, the downhill information, the uphill information, the curved downward (slope) information, and the curved upward (slope) information may be used. In such a case, an arrow may be given to the tip of the mark to clarify a traveling direction. Alternatively, the mark may gradually change in thickness with distance between the vehicle and the road surface as the superposition target to express a sense of perspective.

The plurality of marks may have any shape, such as a polygon shape, other than a circle shape and a gull-wing shape.

In the above-described embodiment, variation, and example of the present disclosure, the optical system is the concave mirror 40. However, the prevent disclosure is not limited thereto. The optical system may be, for example, a convex mirror, or may include a curved mirror (a concave mirror or a convex mirror) and a mirror disposed between the curved mirror and the screen 30.

In the above-described embodiment, variation, and example of the present disclosure, the optical scanning device includes the scanning mirror 20, but may not include the scanning mirror 20.

In the above-described embodiment, variation, and example of the present disclosure, a laser diodes (LD), such as an end-surface emitting laser, is used as the light-source device 11. Alternatively, other types of light source, such as vertical-cavity surface-emitting lasers (VCSEL), may be used.

In the above-described embodiment, variation, and example of the present disclosure, the HUD 100 is configured to correspond to a color image. However, the HUD 100 may be configured to correspond to a monochrome image.

Moreover, the transmission and reflection member is not limited to a front windshield (front window) of a vehicle, and may be, for example, a side windshield or a rear windshield. That is, the transmission and reflection member is preferably a window member (windshield) that is mounted on a vehicle for a viewer to visually identify the outside of the vehicle.

In the above-described embodiment, variation, and example, cases in which the HUD 100 is mounted on a vehicle were described. However, no limitation is indicated thereby, and variations may be made as long as the HUD 100 is mounted on a vehicle that travels on a road surface. For example, the vehicle used in a vehicle device VD according to the present disclosure is not limited to a four-wheeled vehicle, and may be a motorcycle or an auto tricycle. In this case, a windshield or a combiner is preferably mounted on a vehicle as the transmission and reflection member. Examples of a power source of a vehicle include, for example, an engine, a motor, and the combination thereof.

Further, the specific numerical values and shapes in the above-described embodiments, variations, and examples are merely one example and are appropriately modified without departing from the spirit of the present disclosure.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), DSP (digital signal processor), FPGA (field programmable gate array) and conventional circuit components arranged to perform the recited functions.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. A head-up display (HUD) mounted on a vehicle, comprising:
   processing circuitry configured to generate direction-change information representing a change in a direction of travel to be followed by the vehicle, the direction-change information being indicated by a plurality of marks to be displayed at a display area in a superimposing form on a road surface, the display area being fixed at a windshield of the vehicle and contents of the display area change in accordance with the travel of the vehicle; and
   a display system configured to generate an image corresponding to the direction-change information to be virtually displayed, the image being displayed at the display area,
   wherein:
   at a first timing, a first plurality of marks indicating direction-change information that indicates the change in the direction of traveling to be followed by a vehicle are superimposed by the processing circuitry on a location for changing direction of the road surface which is a first portion of the road surface within the display area, at a second timing which occurs after the first timing and during which the location for changing direction has moved outside the display area, a second plurality of marks indicating the direction-change information are displayed using the processing circuitry in the display area which is displaying a second portion of the road surface within the display area, shapes of the first plurality of marks differ from the shapes of the second plurality of marks, and the second portion of the road surface is located ahead of the first position of the road surface.

2. The HUD according to claim 1, wherein:
the direction-change information includes a travel direction to be changed, and
the processing circuitry is further configured to shift the at least one of the plurality of marks to a direction based on the travel direction to be changed.

3. The HUD according to claim 1,
wherein the direction-change information includes curve information.

4. The HUD according to claim 3,
wherein the direction for which the at least one of the plurality of marks is shifted includes a component of a direction away from a center of curvature of the curve information.

5. The HUD according to claim 1,
wherein the direction-change information includes uphill information.

6. The HUD according to claim 1,
wherein the direction-change information includes downhill information.

7. The HUD according to claim 1,
wherein the processing circuitry is further configured to control a position of at least one of the marks based on at least one of a degree of slope of the road surface, a degree of curvature of the road surface, and a distance between the vehicle and a position at which each of the plurality of marks is superimposed on the road surface which is ahead of the vehicle when viewed from the driver of the vehicle.

8. The HUD according to claim 1,
wherein the processing circuitry is further configured to shift at least two marks of the plurality of marks in order of increasing distance between the vehicle and a position at which each of the plurality of marks is superimposed on a road surface ahead of the vehicle when viewed from the driver of the vehicle.

9. The HUD according to claim 1,
wherein the processing circuitry is further configured to shift at least two marks of the plurality of marks in order of decreasing distance between the vehicle and a position at which each of the plurality of marks is superimposed on a road surface ahead of the vehicle when viewed from the driver of the vehicle.

10. The HUD according to claim 1,
wherein at least two of the plurality of marks are triangular arrows.

11. The HUD according to claim 1,
wherein at least two marks of the plurality of marks change in shape before and after shifting.

12. The HUD according to claim 1,
wherein at least two marks of the plurality of marks are displayed in decreasing size as a perceived distance from the vehicle increases.

13. The HUD according to claim 1,
wherein the display system comprises:

an image-light generator configured to generate an image of light corresponding to input information; and
an optical system configured to guide the generated image of light to a transmission and reflection member.

14. A vehicle device comprising:
the HUD according to claim 1; and
a camera.

15. The vehicle device according to claim 14, further comprising a GPS mounted on the vehicle to provide information to the HUD.

16. The HUD according to claim 1, wherein:
a first relative position between a first two marks superimposed on the first portion of the road surface in the direction of travel are opposite to a second relative position between a second two marks superimposed on the second portion of the road surface in the direction of travel, and
an interval between the second two marks superimposed on the second portion of the road surface is smaller than an interval between the first two marks superimposed on the first portion of the road surface.

17. The HUD according to claim 16, wherein:
an interval between the two marks superimposed on the first portion of the road surface is larger than an interval between other two marks superimposed on the second portion of the road surface, and
the first relative position between the two marks superimposed on the first portion of the road surface is opposite to the second relative position between the second two marks superimposed on the second portion of the road surface in the direction of travel.

18. An information display method comprising:
generating direction-change information representing a change in a direction of travel to be followed by a vehicle, the direction-change information being indicated by a plurality of marks to be displayed at a display area, the display area being fixed at a windshield of the vehicle and contents of the display area change in accordance with the travel of the vehicle;
generating an image corresponding to the direction-change information to be virtually displayed,
wherein;
at a first timing, a first plurality of marks indicating direction-change information that indicates the change in the direction of traveling to be followed by a vehicle are superimposed by on a location for changing direction of the road surface which is a first portion of the road surface within the display area,
at a second timing which occurs after the first timing and during which the location for changing direction has moved outside the display area, a second plurality of marks indicating the direction-change information are displayed in the display area which is displaying a second portion of the road surface within the display area,
shapes of the first plurality of marks differ from the shapes of the second plurality of marks, and
the second portion of the road surface is located ahead of the first position of the road surface.

19. A non-transitory recording medium storing a computer-readable code for controlling a computer system to carry out an image processing method including:
generating direction-change information representing a change in a direction of travel to be followed by a vehicle, the direction-change information being indicated by a plurality of marks to be displayed at a display area, the display area being fixed at a windshield of the vehicle and contents of the display area change in accordance with the travel of the vehicle;
generating an image corresponding to the direction-change information to be virtually displayed, wherein;
at a first timing, a first plurality of marks indicating direction-change information that indicates the change in the direction of traveling to be followed by a vehicle are superimposed by on a location for changing direction of the road surface which is a first portion of the road surface within the display area,
at a second timing which occurs after the first timing and during which the location for changing direction has moved outside the display area, a second plurality of marks indicating the direction-change information are displayed in the display area which is displaying a second portion of the road surface within the display area,
shapes of the first plurality of marks differ from the shapes of the second plurality of marks, and
the second portion of the road surface is located ahead of the first position of the road surface.

\* \* \* \* \*